US012617327B2

(12) United States Patent
    Maxwell

(10) Patent No.:     US 12,617,327 B2
(45) Date of Patent:          May 5, 2026

(54) CONFIGURABLE CARGO SUPPORT STRUCTURE AND METHOD OF USE

(71) Applicant: Richard S. Maxwell, Lawrenceville, NJ (US)

(72) Inventor: Richard S. Maxwell, Lawrenceville, NJ (US)

( * ) Notice: Subject to any disclaimer, the term of this patent is extended or adjusted under 35 U.S.C. 154(b) by 370 days.

(21) Appl. No.: 17/682,253

(22) Filed: Feb. 28, 2022

(65) Prior Publication Data

US 2022/0297586 A1     Sep. 22, 2022

Related U.S. Application Data

(60) Provisional application No. 63/161,522, filed on Mar. 16, 2021.

(51) Int. Cl.
     *B60N 3/04*          (2006.01)

(52) U.S. Cl.
     CPC ............. *B60N 3/044* (2013.01); *B60N 3/048* (2013.01)

(58) Field of Classification Search
     CPC ...... B60N 3/048; B60N 3/044; B60N 2/6009; B60N 2/36; B60N 2/3065; B60N 2/206; B60R 13/011; B60R 13/013; B60R 13/0275; B60R 13/01; B60R 5/045; B60R 7/02
     USPC ................ 296/24.43, 37.5, 39.1, 39.2, 97.23
     See application file for complete search history.

(56) References Cited

U.S. PATENT DOCUMENTS

| | | | |
|---|---|---|---|
| 2,898,146 A | | 8/1959 | Yudenfreund |
| 3,902,752 A | * | 9/1975 | Pelletier ................... B60J 11/06 |
| | | | 280/727 |

| | | | |
|---|---|---|---|
| 5,215,345 A | * | 6/1993 | Orphan ................ B60N 2/6009 |
| | | | 296/37.16 |
| 5,322,335 A | * | 6/1994 | Niemi ..................... B60R 13/01 |
| | | | 296/97.23 |
| 6,017,074 A | | 1/2000 | Biskup |
| 6,406,085 B1 | | 6/2002 | Stanesic |
| 6,663,156 B1 | * | 12/2003 | Kincaid .................... B60R 5/04 |
| | | | 296/97.23 |
| 7,178,851 B1 | * | 2/2007 | Gridley .................. B60R 13/01 |
| | | | 296/39.1 |
| 7,637,551 B2 | * | 12/2009 | Mahaffy ................. B60R 7/043 |
| | | | 296/39.1 |
| 8,808,828 B2 | * | 8/2014 | Preisler ..................... B60R 5/00 |
| | | | 428/95 |

(Continued)

FOREIGN PATENT DOCUMENTS

| | | | | |
|---|---|---|---|---|
| DE | 102014118864 A1 | * | 6/2015 | ........... B60R 13/011 |
| EP | 3450256 B1 | | 3/2020 | |
| FR | 2948103 B1 | | 7/2011 | |

OTHER PUBLICATIONS

Machine Translation of DE102014118864 (Year: 2024).*

(Continued)

*Primary Examiner* — Jason S Morrow

(74) *Attorney, Agent, or Firm* — Ward and Smith, P.A.; Ryan K. Simmons

(57)          ABSTRACT

A configurable cargo support structure. The configurable cargo support structure may include foldable support panels, wherein adjacent foldable support panels may be connected via a foldable joint extending along at least a portion of a length of adjacent foldable support panels, and wherein the foldable support panels may be made of at least one of a rigid or semi-rigid material.

13 Claims, 23 Drawing Sheets

(56) References Cited

U.S. PATENT DOCUMENTS

| | | | |
|---|---|---|---|
| 9,211,842 | B2 | 12/2015 | Gaas |
| D807,275 | S * | 1/2018 | Bennett ........................ D12/401 |
| 10,343,568 | B2 * | 7/2019 | Umlauf ................ B60N 2/6036 |
| 11,066,019 | B2 * | 7/2021 | Aguilar Ruelas ....... B60R 5/045 |
| 11,432,527 | B1 * | 9/2022 | Pan ...................... B60N 2/6027 |
| 11,691,550 | B2 * | 7/2023 | Umlauf ................ B60N 2/6027 |
| | | | 297/229 |
| 11,987,159 | B2 * | 5/2024 | Koinuma ................. B60N 2/36 |
| 2008/0185866 | A1 | 8/2008 | Tarrant et al. |
| 2015/0343956 | A1 * | 12/2015 | Hipshier ................. B60N 2/90 |
| | | | 296/37.8 |
| 2016/0235235 | A1 * | 8/2016 | Burden ................. B60N 3/048 |
| 2018/0086497 | A1 * | 3/2018 | Kohn ................... A47G 11/003 |
| 2019/0375334 | A1 * | 12/2019 | Whitman ................ B60R 5/048 |
| 2024/0123887 | A1 * | 4/2024 | Granger .............. B60N 2/6009 |

OTHER PUBLICATIONS

DNA Motoring, TTC-HARD-001 Truck Bed Top Hard Solid Tri-fold Tonneau Cover Replacement for 04-14 F150 5.5ft. Fleetside Bed, Amazon, retrieved on Jan. 28, 2021 from https://www.amazon.com/DNA-Motoring-TTC-HARD-001-Tri-Fold-Tonneau/dp/B07JC3JYNL.

Dogshell, Car and SUV Backseat Cover, DogShell, retrieved on Jan. 28, 2021 from https://www.dogshell.com/product/car.

Canvasback Cargo Liners, It's all about fillin' in the gaps!, Gap Covers, retrieved on Jan. 28, 2021 from https://www.pinterest.com/pin/483011128790644124/.

* cited by examiner

Figure 10:
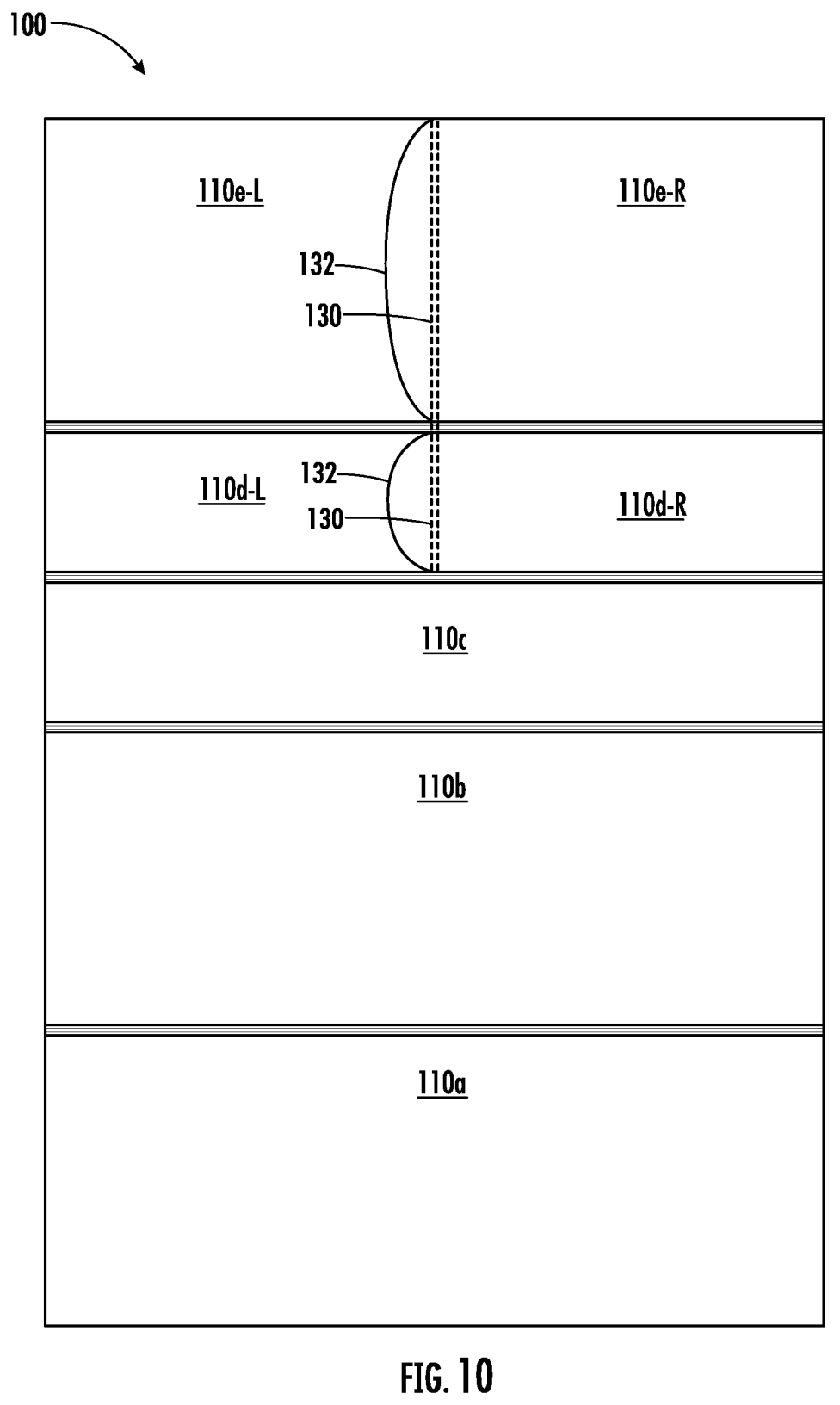

CONFIGURABLE CARGO SUPPORT STRUCTURE AND METHOD OF USE

RELATED APPLICATIONS

This application claims priority to U.S. patent application Ser. No. 63/161,522, filed Mar. 16, 2021, the disclosure of which is incorporated herein by reference in its entirety.

TECHNICAL FIELD

The subject matter of the invention relates generally to cargo area liners and more particularly to a configurable cargo support structure and method of use in a cargo area.

BACKGROUND

The recent market demand for captain seats and third row seating configurations in sport utility vehicles (SUVs) and minivans has created significant drawbacks when trying to use the mixed-use cargo space efficiently. The currently available cargo liners do not meet the full range of needs required by the market. Consumers who favor captain seats and third row seating capacity must sacrifice usable cargo space when the seating configurations are altered. Further, modified seating configurations limit the consumer's ability to protect the vehicle's interior with the cargo liners currently in the market.

SUMMARY

In one embodiment, a configurable cargo support structure is provided. The configurable cargo support structure may include foldable support panels, wherein adjacent foldable support panels may be connected via a foldable joint extending along at least a portion of a length of adjacent foldable support panels, and wherein the foldable support panels may be made of at least one of a rigid or semi-rigid material. The foldable support panels may include an outer covering material. The foldable joints may be formed of the outer covering material at a space along the length between adjacent foldable support panels. The adjacent foldable support panels may be configured to fold atop one another in a folded configuration. The foldable support panels may be configurable to fold accordion style in a single stack in a fully folded configuration. The foldable support panels may be configurable to lay in a flat planer fashion in a fully unfolded configuration. The foldable support panels may be configurable such that one or more of the foldable support panels may be in a stacked configuration and one or more of the foldable support panels may be in a flat planer configuration in a partially unfolded configuration. The foldable support panels may all be of substantially the same length. The one or more of the foldable support panels may include a different length from one or more of the other foldable support panels. The foldable support panels all may be of about the same width. The one or more of the foldable support panels may be split widthwise, wherein the one or more split foldable support panels may be configurable to be of a full width in a non-split configuration or a partial width in a split configuration. The one or more split foldable support panels each may include a first split panel and a second split panel, and wherein at least one of the first split panel and the second split panel may include a flap that overlaps a portion of the other one of the first split panel and the second split panel. A thickness at the foldable joint may be less than a thickness of the foldable support panels. The one or more unfolded foldable support panels of the foldable support panels may be configured to rest atop one or more folded down seats in a vehicle. In the fully-folded configuration, the one or more panels may be configured to be storable behind a last row of seats of a vehicle with all seats of the vehicle in their unfolded position.

In another embodiment, a method of using a configurable cargo support structure in a vehicle is provided. The method may include providing a first configurable cargo support structure. The first configurable cargo support structure may include foldable support panels, wherein adjacent foldable support panels may be connected via a foldable joint extending along at least a portion of a length of adjacent foldable support panels, and wherein the foldable support panels may be made of at least one of a rigid or semi-rigid material. The method may further include, adjusting a seat configuration of a vehicle; and arranging the foldable support panels of the first configurable cargo support structure to substantially match the adjusted vehicle seat configuration. The foldable support panels may be arranged to substantially cover an expanded vehicle cargo area created by folding down or removing one or more seats during the adjusting of the seat configuration of the vehicle. The foldable support panels may create a substantially continuous span across the expanded vehicle cargo area. The method may further include providing a second configurable cargo support structure, wherein foldable support panels of the second configurable cargo support structure may have a width less than that of the foldable support panels of the first configurable cargo support structure. The second configurable cargo support structure may be configurable to substantially cover at least a portion of an expanded vehicle cargo area created by folding down or removing less than all of the seats of a row of seats during the adjusting of the seat configuration of the vehicle.

BRIEF DESCRIPTION OF THE DRAWINGS

Figure 1:
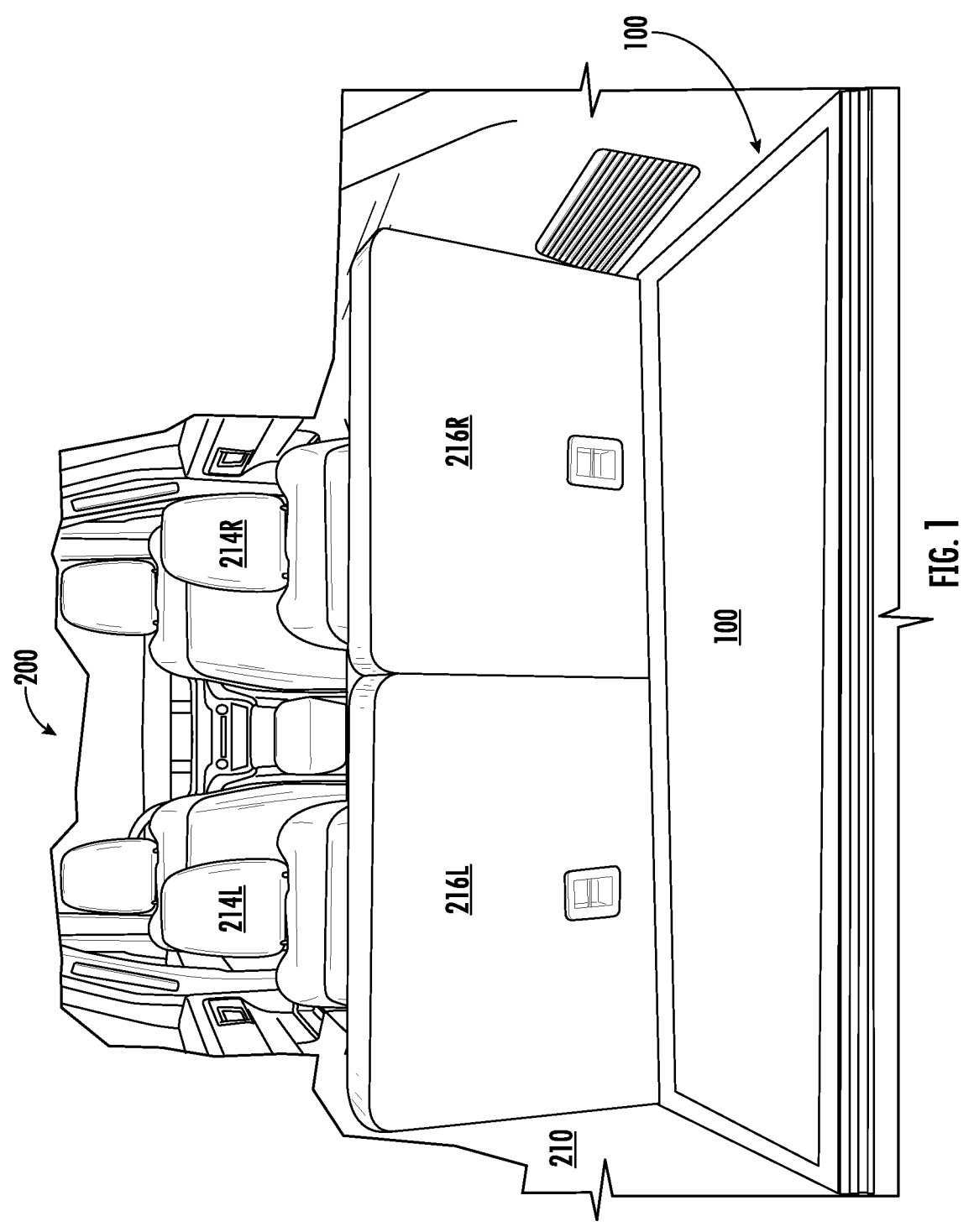
Figure 2:
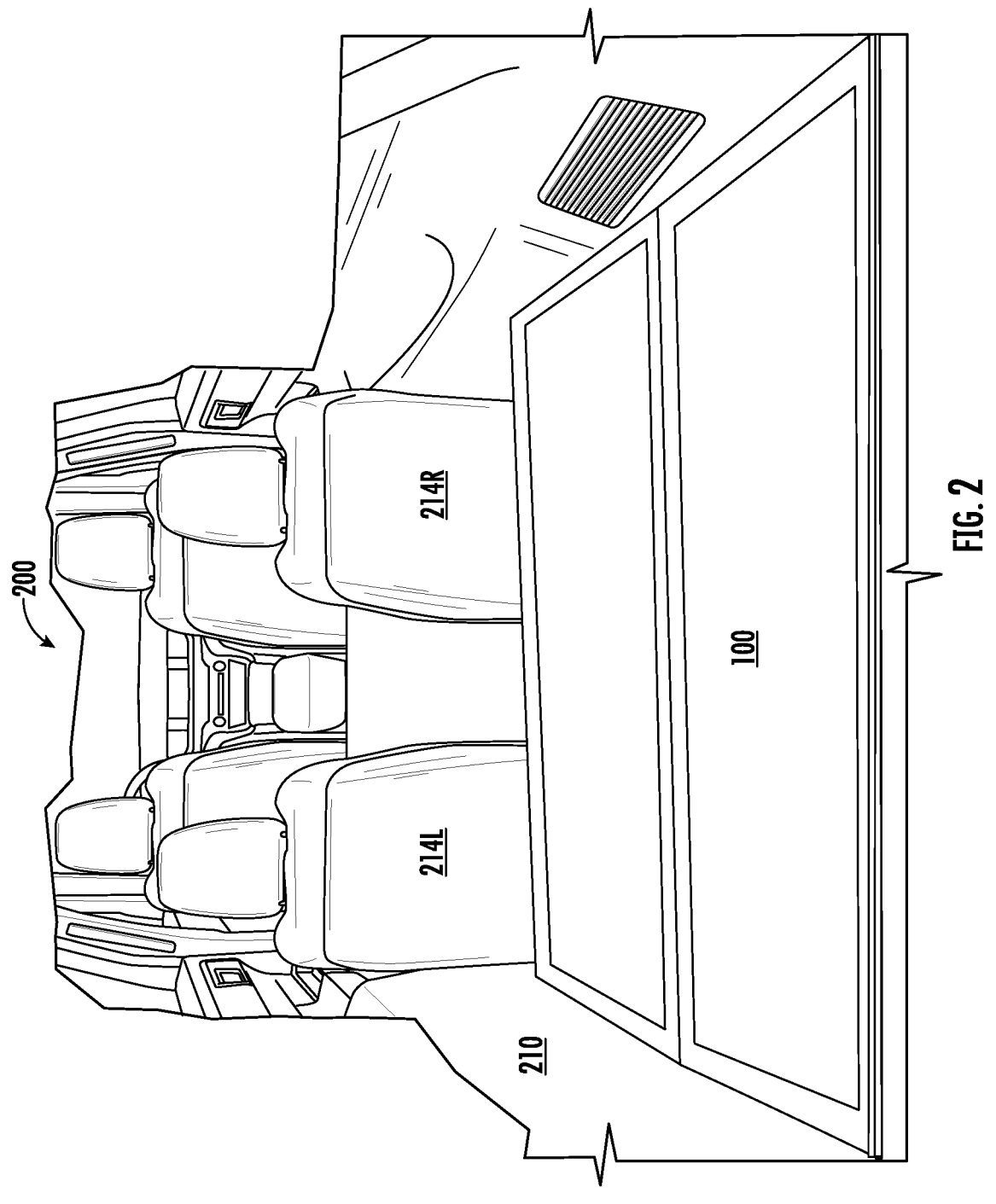
Figure 3:
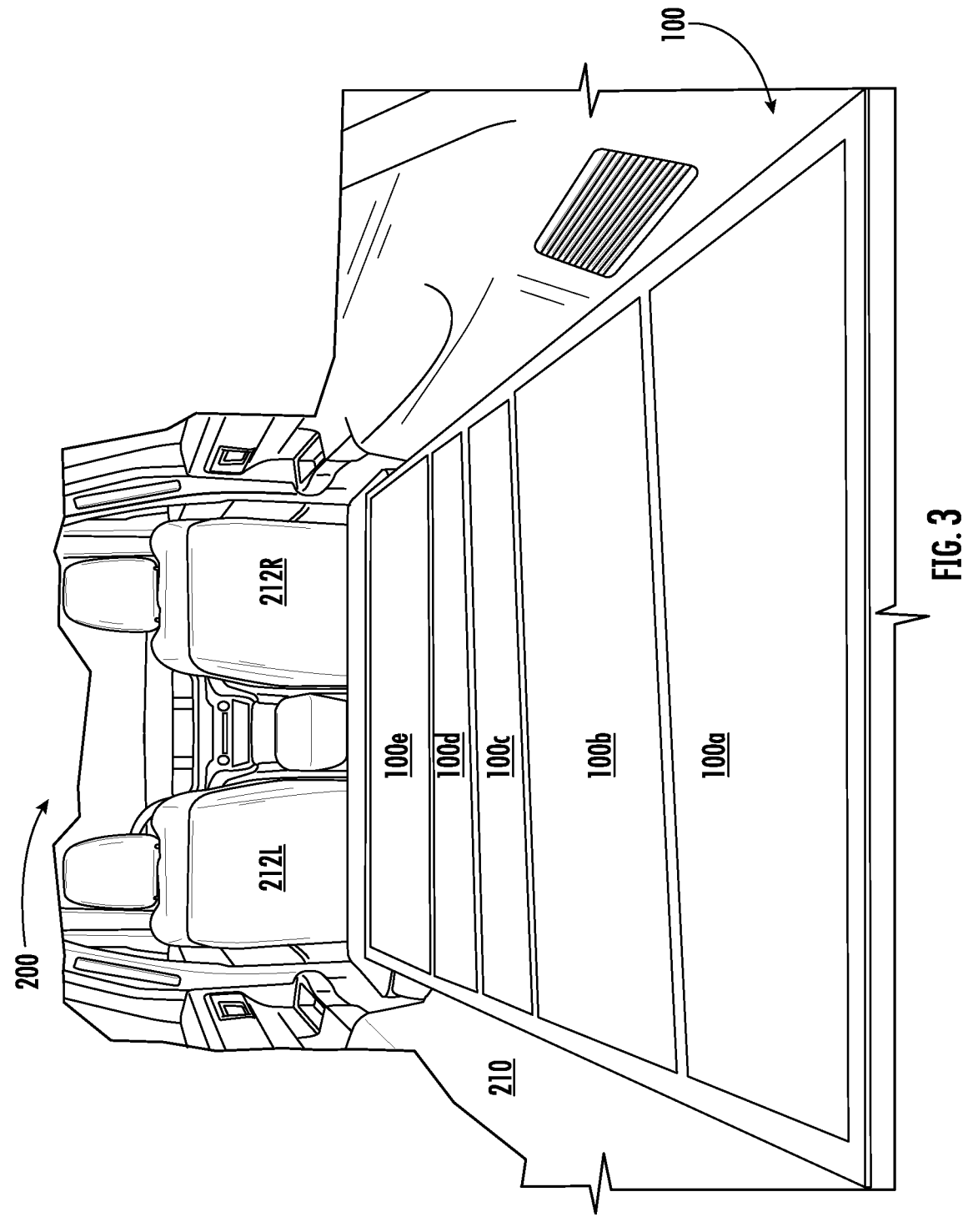
Figure 4:
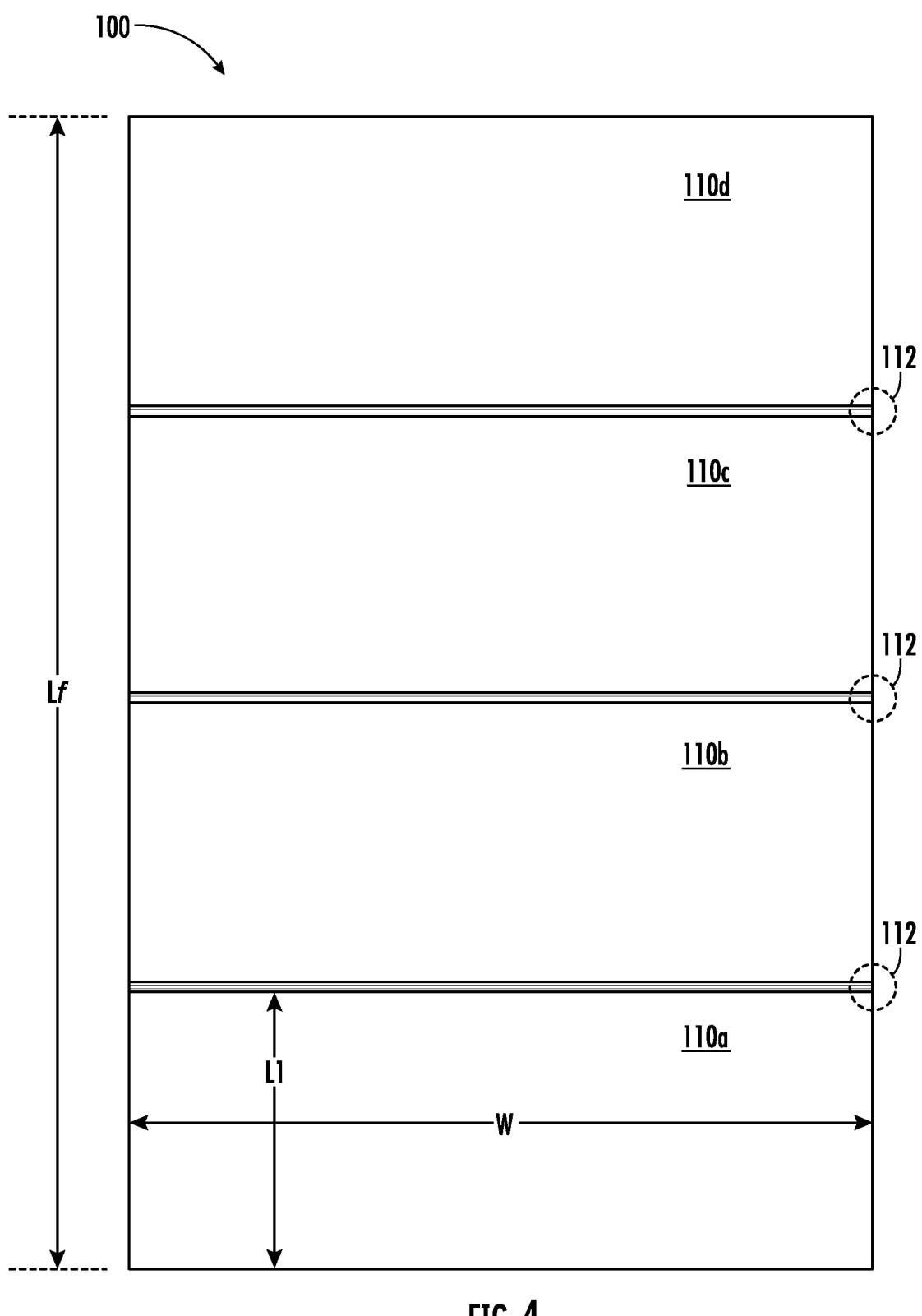
Figure 5:
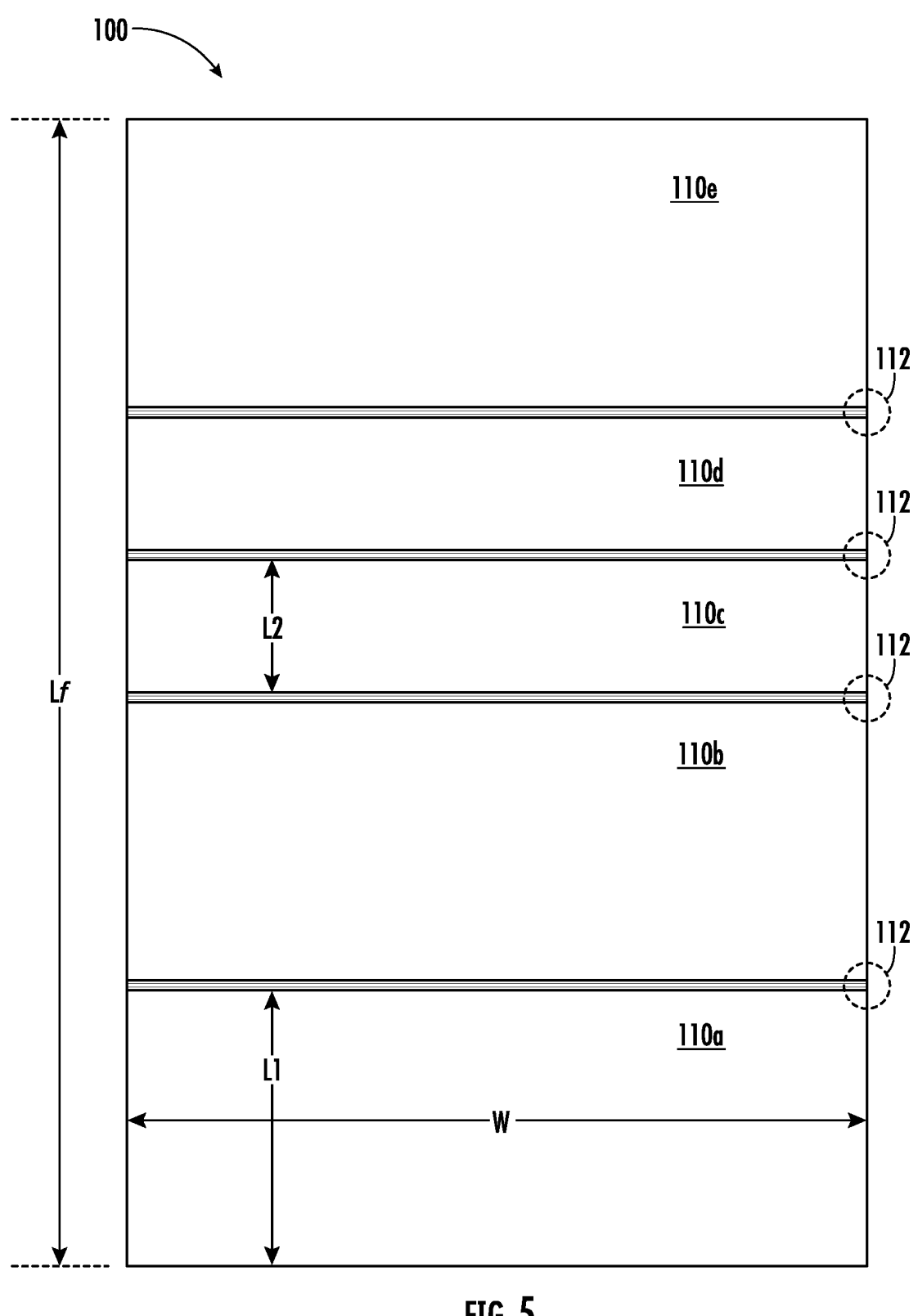
Figure 6:
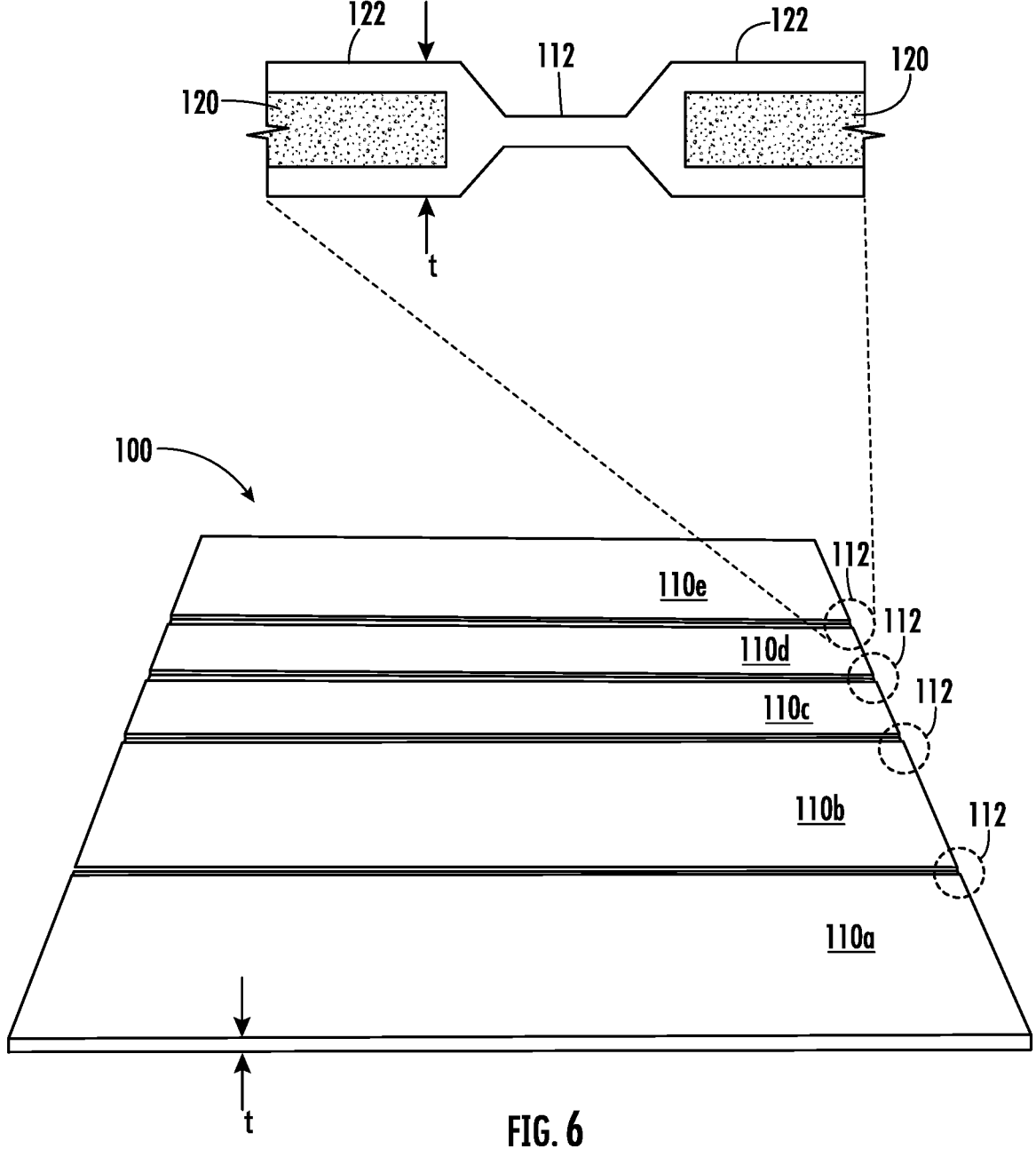
Figure 7A:
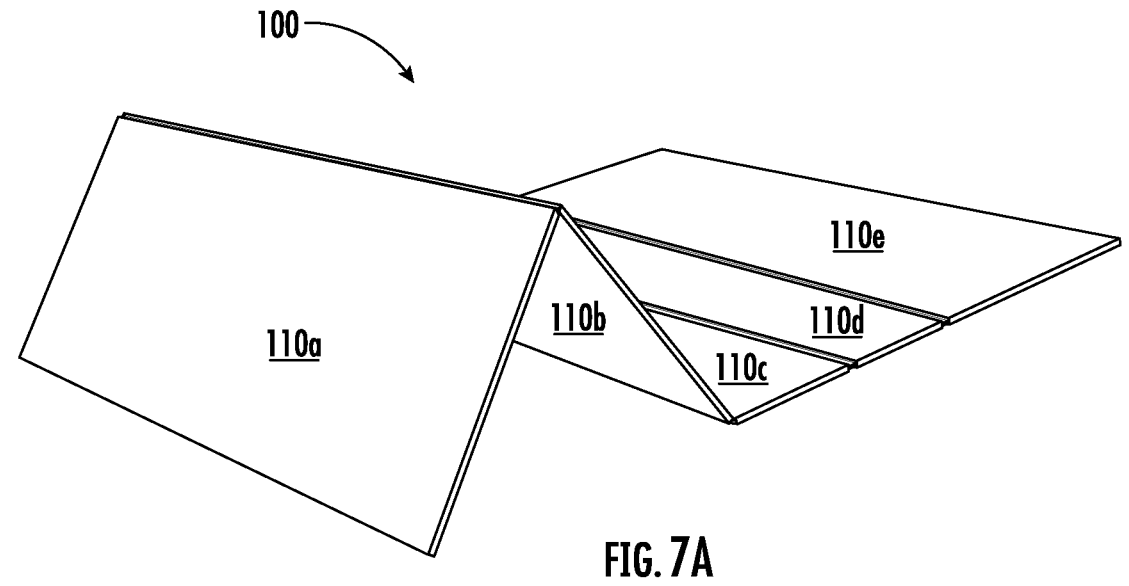
Figure 7B:
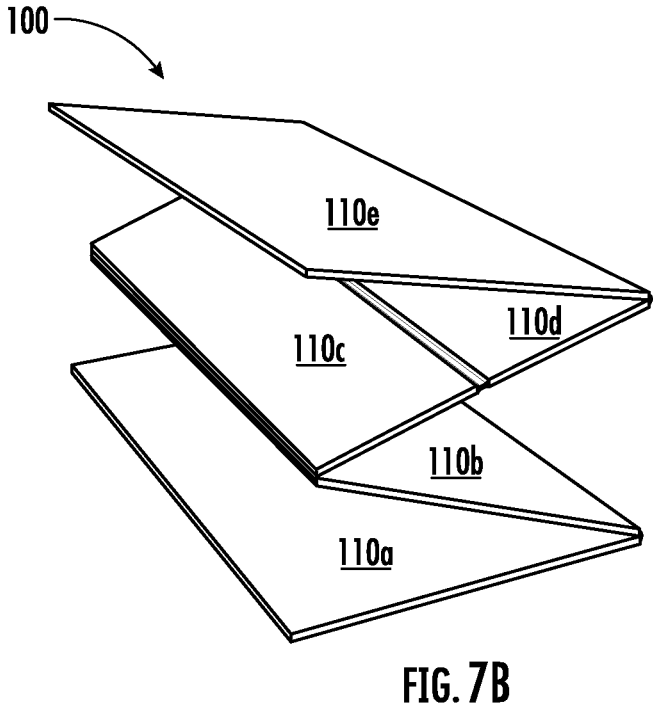
Figure 19:
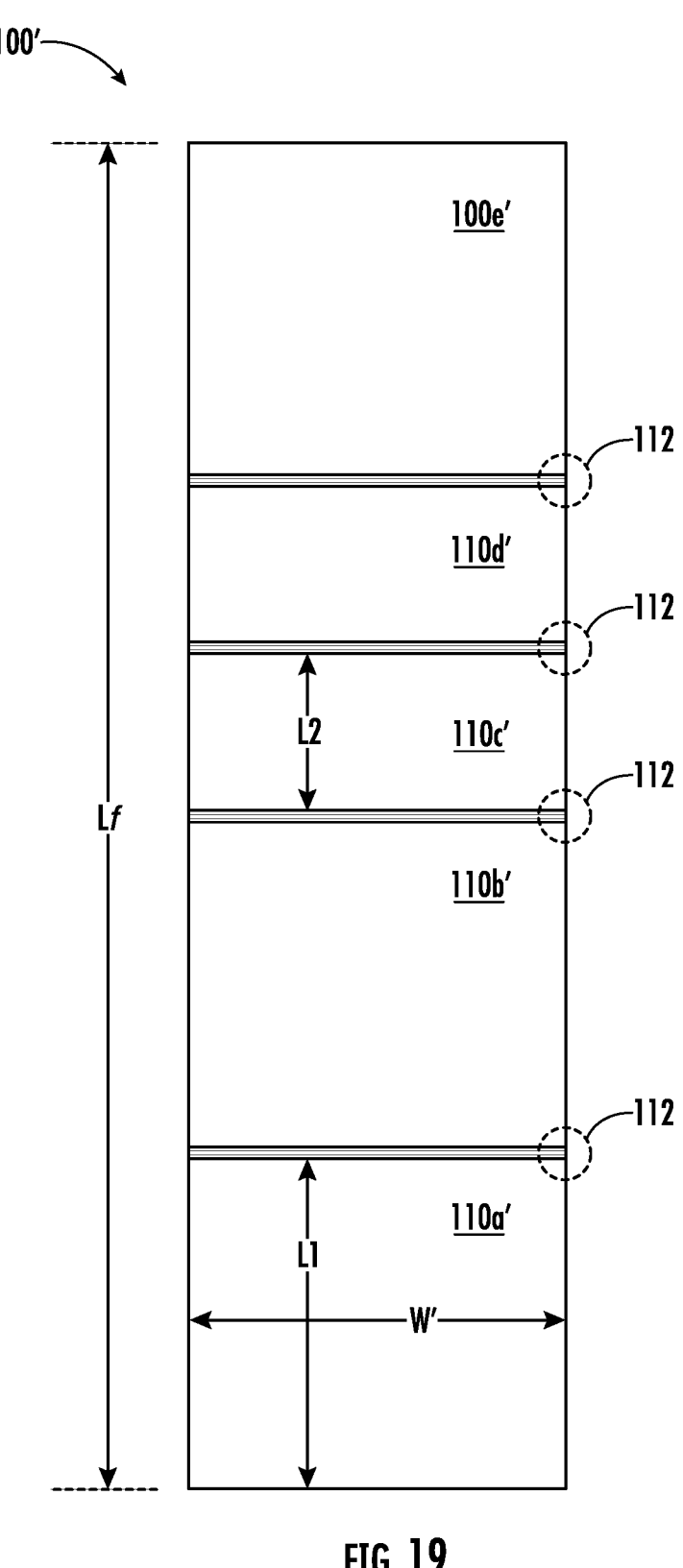
Figure 20:
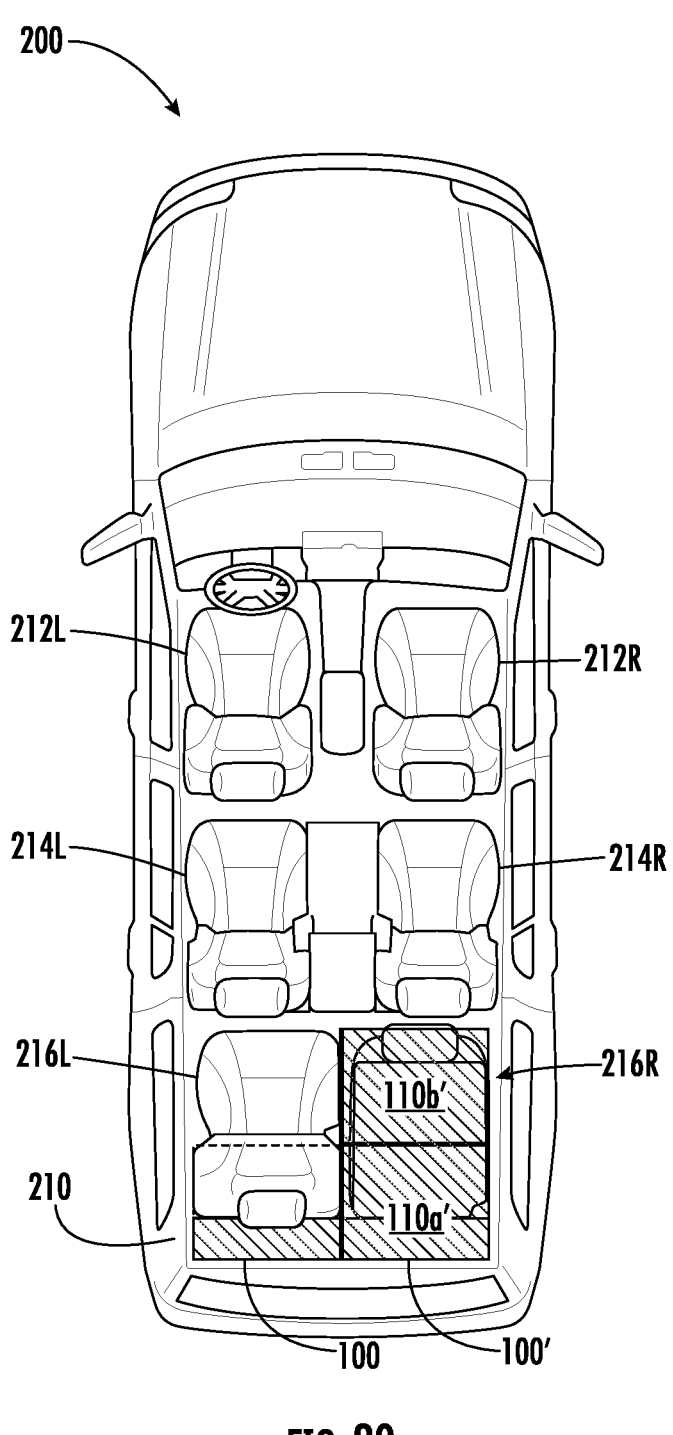
Figure 21:
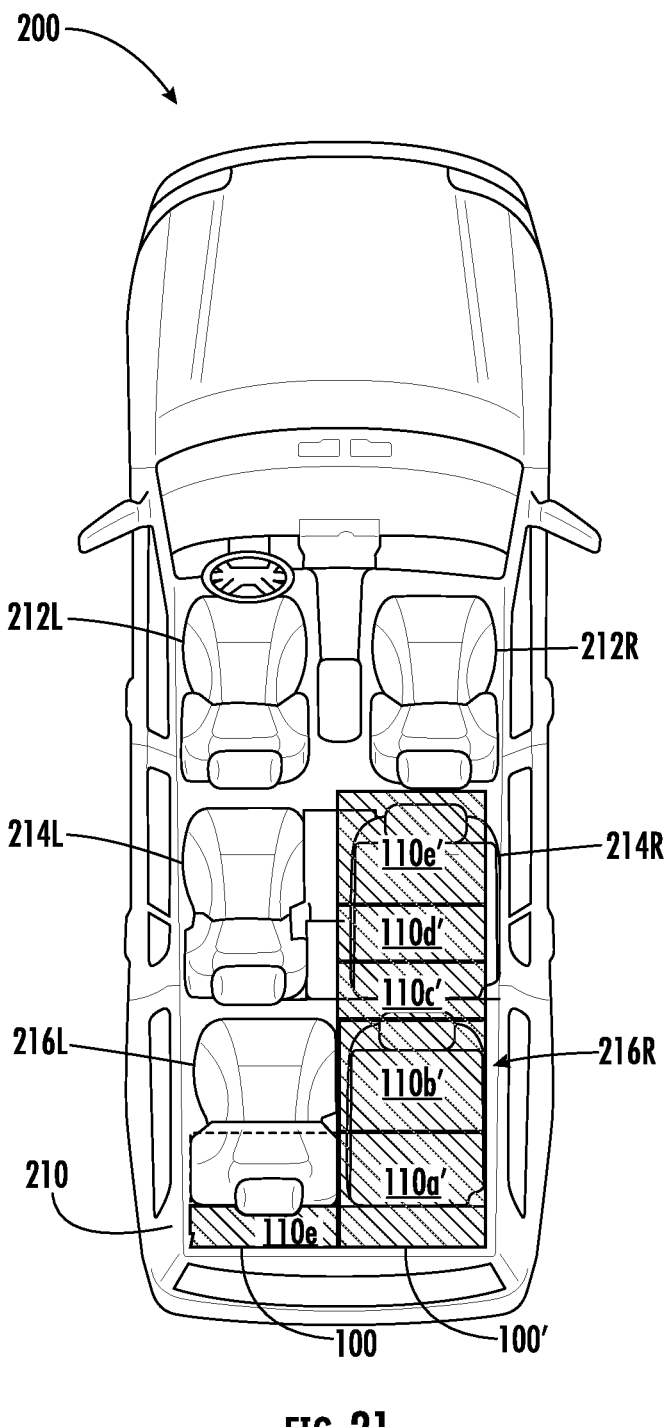
Figure 22:
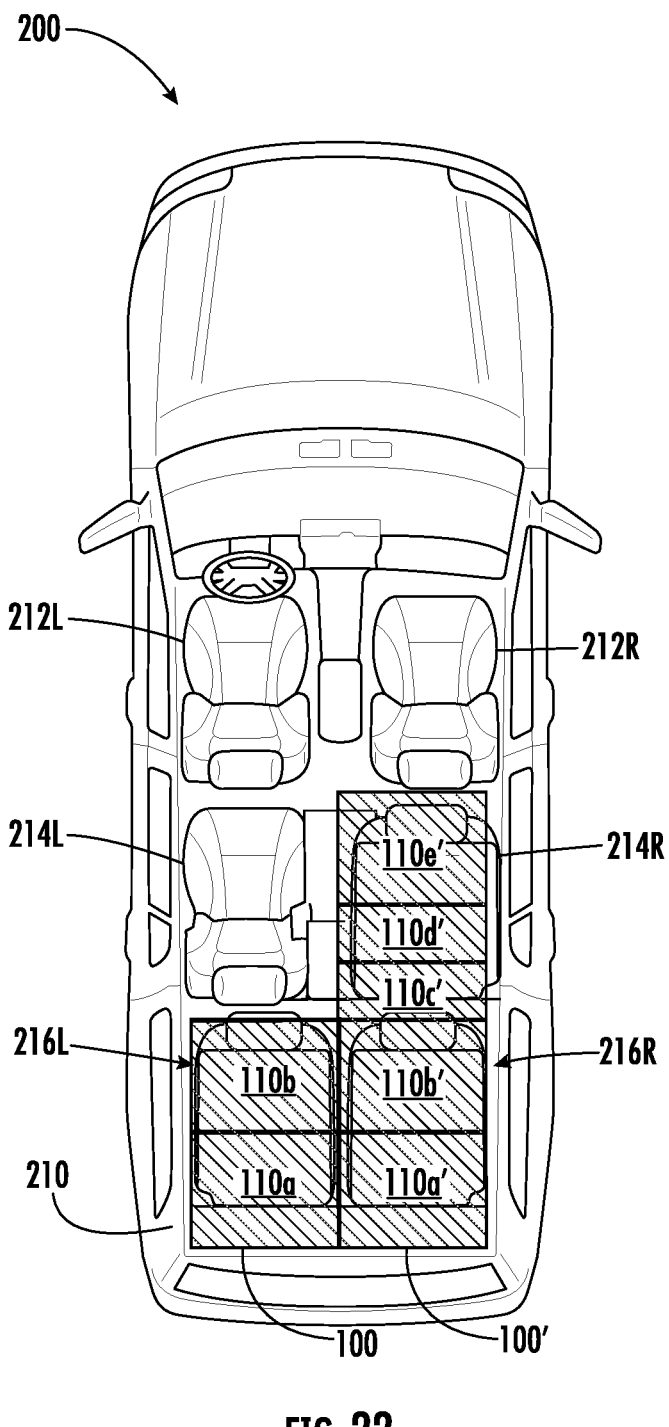
Figure 23:
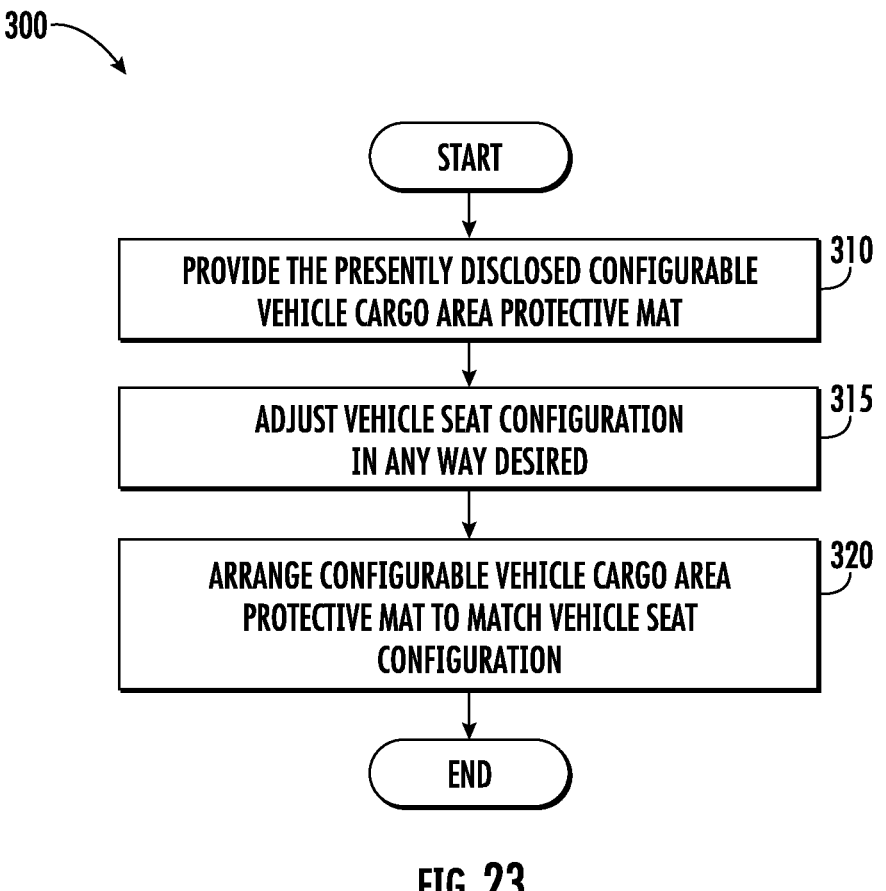

Having thus described the subject matter of the invention in general terms, reference will now be made to the accompanying drawings, which are not necessarily drawn to scale, and wherein:

FIG. 1, FIG. 2, and FIG. 3 illustrate examples of a configurable cargo support structure in different configurations, in accordance with an embodiment of the invention;

FIG. 4 illustrates a plan view of an example of the configurable cargo support structure, in accordance with an embodiment of the invention;

FIG. 5 illustrates a plan view of another example of the configurable cargo support structure, in accordance with an embodiment of the invention;

FIG. 6 illustrates a perspective view, of the configurable cargo support structure of FIG. 5, in accordance with an embodiment of the invention;

FIG. 7A and FIG. 7B illustrate schematic views of an example of folding the configurable cargo support structure of FIG. 5 and FIG. 6;

FIG. 8 through FIG. 12 illustrate various views of examples of the configurable cargo support structure shown in FIG. 5 and FIG. 6 including one or more split foldable panels, in accordance with an embodiment of the invention;

FIG. 13 through FIG. 18 illustrate plan views of an example of the configurable cargo support structure shown in FIG. 5 through FIG. 12 installed according to various vehicle seat configurations, in accordance with an embodiment of the invention;

FIG. 19 illustrates a plan view of an example of another embodiment of a configurable cargo support structure, in accordance with an embodiment of the invention;

FIG. 20 through FIG. 22 illustrate plan views of an example of the configurable cargo support structure shown in FIG. 19 used in conjunction with the configurable cargo support structure shown in FIG. 5 installed according to various vehicle seat configurations, in accordance with an embodiment of the invention; and FIG. 23 illustrates a flow diagram of an example of a method of using the configurable cargo support structure, in accordance with an embodiment of the invention.

DETAILED DESCRIPTION

The subject matter of the invention now will be described more fully hereinafter with reference to the accompanying drawings, in which some, but not all embodiments of the subject matter of the invention are shown. Like numbers refer to like elements throughout. The subject matter of the invention may be embodied in many different forms and should not be construed as limited to the embodiments set forth herein; rather, these embodiments are provided so that this disclosure will satisfy applicable legal requirements. Indeed, many modifications and other embodiments of the subject matter of the invention set forth herein will come to mind to one skilled in the art to which the subject matter of the invention pertains having the benefit of the teachings presented in the foregoing descriptions and the associated Drawings. Therefore, it is to be understood that the subject matter of the invention is not to be limited to the specific embodiments disclosed and that modifications and other embodiments are intended to be included within the scope of the appended claims.

In some embodiments, the subject matter of the invention provides a configurable cargo support structure and method for use in the cargo area of a vehicle.

In some embodiments, the configurable cargo support structure and method may provide a substantially continuous rigid and/or semi-rigid platform for holding cargo in the cargo area of a vehicle and for supporting significant cargo weight.

In some embodiments, the configurable cargo support structure and method may include foldable panels that may be configured to substantially match the available cargo area based on the vehicle seat configuration and thereby provide a platform for maximizing the cargo capacity of a vehicle.

In some embodiments, the configurable cargo support structure and method may provide a rigid and/or semi-rigid support platform for holding cargo atop any folded down (or flattened) seats in a vehicle and thereby protect them from damage and/or dirt.

In some embodiments, the configurable cargo support structure and method may provide an arrangement of full-width foldable panels.

In some embodiments, the configurable cargo support structure and method may provide an arrangement of both fullwidth foldable panels and split foldable panels and wherein a split foldable panel may include an arrangement of half- or partial-width panels.

In some embodiments, the configurable cargo support structure and method may include foldable panels that can remain in and stored in the vehicle regardless of the seating configuration. Wherein, even in its fully folded up configuration the configurable cargo support structure can support cargo on top of it.

Further, a method is provided of using the configurable cargo support structure to provide a substantially continuous rigid and/or semi-rigid platform for holding cargo in the cargo area of the vehicle.

Referring now to FIG. 1, FIG. 2, and FIG. 3 illustrate examples of a configurable cargo support structure 100 for use in the cargo area of a vehicle, in accordance with an embodiment of the invention. Configurable cargo support structure 100 may be configured based on the vehicle seat configuration and thereby provide a platform for maximizing the cargo capacity of a vehicle. Accordingly, configurable cargo support structure 100 may be used to provide a substantially continuous rigid and/or semi-rigid platform for holding cargo in the cargo area of the vehicle and for supporting significant cargo weight.

In one example, configurable cargo support structure 100 may be installed in a vehicle 200, such as an SUV, crossover, minivan, or other style/type of vehicle having multiple seating rows that have foldable/removable seats. Vehicle 200 may have, for example, a cargo area 210, front seats 212 (e.g., a right front seat 212R and a left front seat 212L), second row seats 214 (e.g., a right second row seat 214R and a left second row seat 214L), and third row seats 216 (e.g., a right third row seat 216R and a left third row seat 216L). In this example, front seats 212 may be two bucket seats, the second row seats 214 may be two captain seats, while together the third row seats 216 may form a bench seat. Alternatively, the second row seats 214 may form a bench seat.

In such an example, the front seats 212 would typically always be present while the second row seats 214 and the third row seats 216 may be configured as desired. That is, a user may decide whether one or more of the second row seats 214 and/or whether one or more of the third row seats 216 are present and available for use or are folded down or entirely removed to expand cargo area 210. Accordingly, the configuration of the second row seats 214 and the third row seats 216 determines the available cargo area 210.

Further, in this example, configurable cargo support structure 100 may include two or more foldable panels 110 and wherein each foldable panel 110 may be a rigid and/or semi-rigid panel, such as covered/coated acrylic panels, or any other suitable rigid and/or semi-rigid material. For example, FIG. 1 shows all seats selected, meaning all the second row seats 214 and all the third row seats 216 are folded up (or present). In this example, the foldable panels 110 of configurable cargo support structure 100 may be folded accordion style in a stack in the cargo area 210 behind the third row seats 216. The configuration shown in FIG. 1 demonstrates that configurable cargo support structure 100 may remain in the vehicle even when all seats are selected.

Further, FIG. 2 illustrates an example of the second row seats 214 folded up (or present) while the third row seats 216 are folded down (or removed) to expand cargo area 210. In this example, one or more foldable panels 110 of configurable cargo support structure 100 may be folded forward to cover the expanded cargo area 210 created by the absence of the two third row seats 216.

Further, FIG. 3 illustrates an example of both the second row seats 214 and the third row seats 216 folded down (or removed) to provide yet more cargo area 210. In this example, all the foldable panels 110 of configurable cargo support structure 100 may be unfolded to cover substantially the entire cargo area 210 created by the absence of both the second row seats 214 and the third row seats 216. FIG. 3 illustrates that configurable cargo support structure 100 may include, in one non-limiting example, an arrangement of five (5) foldable panels 110 (e.g., 110a, 110b, 110c, 110d, 110e) that are foldable coupled. However, configurable cargo support structure 100 may include more than or less than five (5) foldable panels 110.

Each of the foldable panels 110 may be a rigid and/or semi-rigid panel, such as covered (see FIG. 6), or any other suitable rigid and/or semi-rigid material. Because of the strength of the material used for the foldable panels 110, for example acrylic panels, configurable cargo support structure 100 may be used to provide a substantially continuous rigid and/or semi-rigid platform for holding cargo in the cargo area of vehicle 200. One benefit of configurable cargo support structure 100 is that it may provide a rigid and/or semi-rigid support platform for holding cargo atop any folded down seats in vehicle 200, and the strength of configurable cargo support structure 100 spanning a gap between any of the seats when folded or removed (e.g., between captain seats in the second row) provides significant support for cargo weight. Configurable cargo support structure 100 further protects the folded down seats in vehicle 200 from damage and/or dirt.

Referring now to FIG. 5 and FIG. 6 that illustrate a plan view and a perspective view, respectively, of an example configurable cargo support structure 100. In this example, adjacent foldable panels 110 (e.g., foldable panels 110a, 110b, 110c, 110d, 110e), of configurable cargo support structure 100 may be joined together at folding portions (folding joints 112). Foldable panels 110 may be, for example, acrylic panels (or any other suitable rigid and/or semi-rigid material), for providing the rigid and/or semi-rigid support platform and providing a platform that can support significant cargo weight. More details of foldable panels 110 and folding joints 112 of configurable cargo support structure 100 are illustrated in FIG. 6.

In one example, each of the foldable panels 110 may have a width W and a length L. Configurable cargo support structure 100 may have a fully expanded length Lf. In one embodiment, as shown for example in FIG. 4, all the foldable panels 110 may be of the same length, e.g., L1. In another embodiment, as shown for example in FIG. 5 and FIG. 6 one or more of the foldable panels 110 may have a length L1 and one or more of the foldable panels 110 may have a length L2. In one example, length L2 may be about half the length of L1. The manufactured dimensions of configurable cargo support structure 100 may vary depending on the size of the vehicle in which it may be used. In one non-limiting example, to fit a full-size SUV (e.g., Ford Explorer, GMC Yukon Denali, Honda Pilot), using a five (5) panel configurable cargo support structure 100, for example as illustrated in FIG. 5, the width W may be in the range of about 44 inches, length L1 may be in the range of about 17 inches, and length L2 may be in the range of about 8.5 inches. Accordingly, configurable cargo support structure 100 may have a fully expanded length Lf in the range of about 68 inches.

Additionally, FIG. 6 illustrates that configurable cargo support structure 100 may have a thickness t. In one non-limiting example, thickness t may be in the range of about ⅜ of an inch to about ½ of an inch. Further, FIG. 6 illustrates a magnified cross-sectional view of an example of folding joint 112 of configurable cargo support structure 100. The folding joint 112 of configurable cargo support structure 100 means the folding joint or coupling portion between foldable panels 110. Generally, each foldable panel 110 may be formed of an inner core layer 120 encased in a cover/coating layer 122. Then, foldable panels 110 may be foldable connected via the flexible material of folding joint 112.

In one example, inner core layer 120 may be formed of a rigid or semi-rigid, strong, lightweight material, such as a rigid acrylic panel (or any other suitable material), that may be, in one non-limiting example, in the range of about ⅛ inches to about ½ inches thick, or any other suitable thickness. Cover/coating layer 122 may be formed of a durable and/or washable material, such as, but not limited to, polyurethane fabric, synthetic rubber, malleable rubber material, vinyl, waterproof canvas, and/or the like. Cover/coating layer 122 may be, in one non-limiting example, in the range of about ⅛ of an inch thick, or any other suitable thickness, on each side of inner core layer 120. In one example, cover/coating layer 122 may provide a treaded rubber or rubber like non-skid surface that offers the same protection from slippage, tears, liquids, and dirt as existing cargo liners. Further, folding joint 112 may be a hinge-like structure, which may be an extension of cover/coating layer 122. Accordingly, the flexible folding joint 112 may likewise be formed of the same or similar material as that of cover/coating layer 122. Flexible folding joint 112 may be, in one non-limiting example, in the range of about ⅛ of an inch to about ¼ of an inch thick, or any other suitable thickness. Further, cover/coating layer 122 of configurable cargo support structure 100 may be provided in any color.

Further, configurable cargo support structure 100 may be lightweight at, in one non-limiting example, in the range of about 5 pounds, which allows for ease of adjustment as seating configurations change. Additionally, configurable cargo support structure 100 may include VELCRO® strips (not shown), or the like, at the ends so that it may be attached to, for example, headrests. Additionally, configurable cargo support structure 100 may include side ringlets (not shown), or the like, that may be used to anchor the platform in any way.

Referring now to FIG. 7A and FIG. 7B are schematic views of an example of how configurable cargo support structure 100 shown in FIG. 5 and FIG. 6 may be folded accordion style.

Referring now to FIG. 8, FIG. 9, FIG. 10, FIG. 11, and FIG. 12 are various views of examples of the configurable cargo support structure 100 shown in FIG. 5 and FIG. 6 including one or more split foldable panels, in accordance with an embodiment of the invention.

Figure 8:

FIG. 8 is a plan view of an example of configurable cargo support structure 100 shown in FIG. 5 and FIG. 6 that includes at least one split panel, e.g., 110e. For example, configurable cargo support structure 100 may include foldable panels 110a, 110b, 110c, 110d, 110e which may be full-width panels. Additionally, foldable panel 110e may be split into two half- or partial-width panels, which is an example of a split foldable panel 110. For example, foldable panel 110e may be split into a right foldable panel 110e-R and left foldable panel 110e-L to form split foldable panel 110e. Accordingly, there may be a split 130 between right foldable panel 110e-R and left foldable panel 110e-L and wherein right foldable panel 110e-R and left foldable panel 110e-L may be folded independently. Optionally, a flap 132 may be provided that covers split 130. For example, right foldable panel 110e-R may slightly overlap left foldable panel 110e-L via flap 132 that covers split 130, or vice versa.

Figure 9:
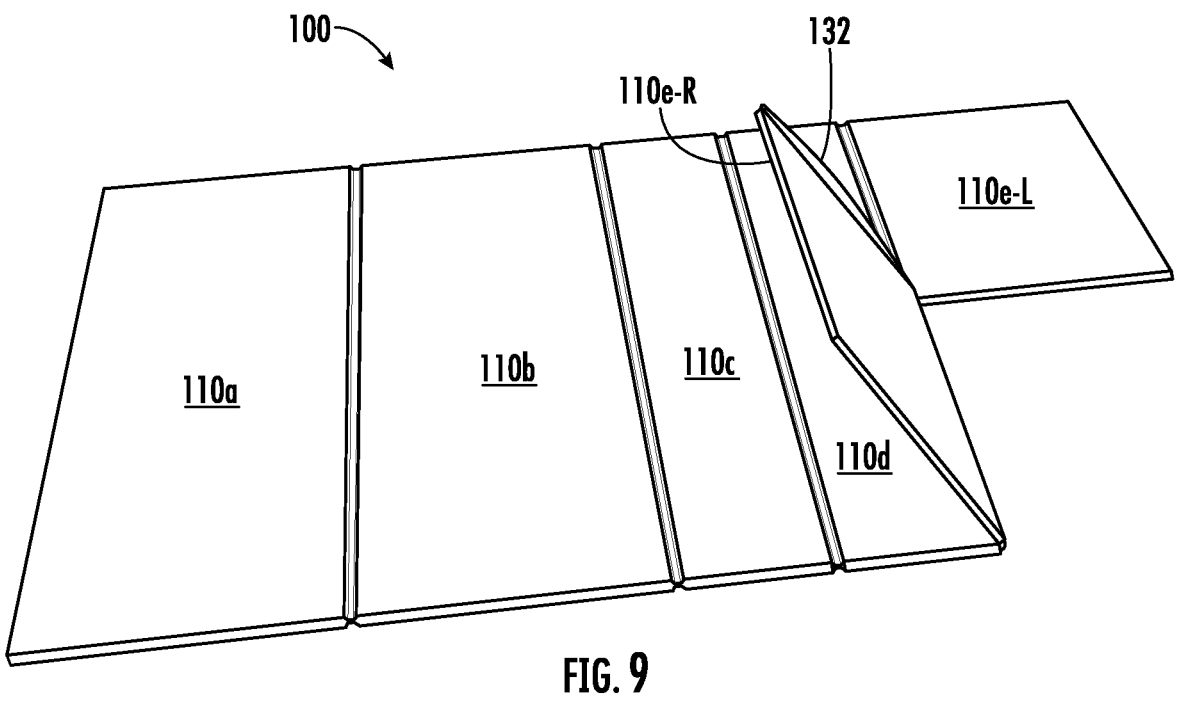

FIG. 9 is a perspective view that shows an example of right foldable panel 110e-R folding independently of left foldable panel 110e-L. Similarly, left foldable panel 110e-L may be folded independently of right foldable panel 110e-R. Further, both right foldable panel 110e-R and left foldable panel 110e-L may be folded together.

Referring still to FIG. 8 and FIG. 9, in any split foldable panel 110, the right foldable panel 110-R and left foldable panel 110-L may be about the same width (as shown) or may be different widths. Additionally, a split foldable panel 110 is not limited to two panels only (e.g., a left and right panel only). A split foldable panel 110 may be split into any number of panels, such as two, three, four, and so on. In one example, split foldable panel 110 may be split into three panels included a left, center, and right panel, which may be the all the same width or different widths.

FIG. 10 is a plan view of an example of the configurable cargo support structure 100 shown in FIG. 5 and FIG. 6 that includes multiple split foldable panels 110. In this example, configurable cargo support structure 100 may include multiple full-width foldable panels, e.g., 110*a*, 110*b*, 110*c*, and multiple split foldable panels, e.g., 110*d* and 110*e*. In this example, split foldable panel 110*d* may include right foldable panel 110*d*-R and left foldable panel 110*d*-L and split foldable panel 110*e* may include right foldable panel 110*e*-R and left foldable panel 110*e*-L.

Figure 11:
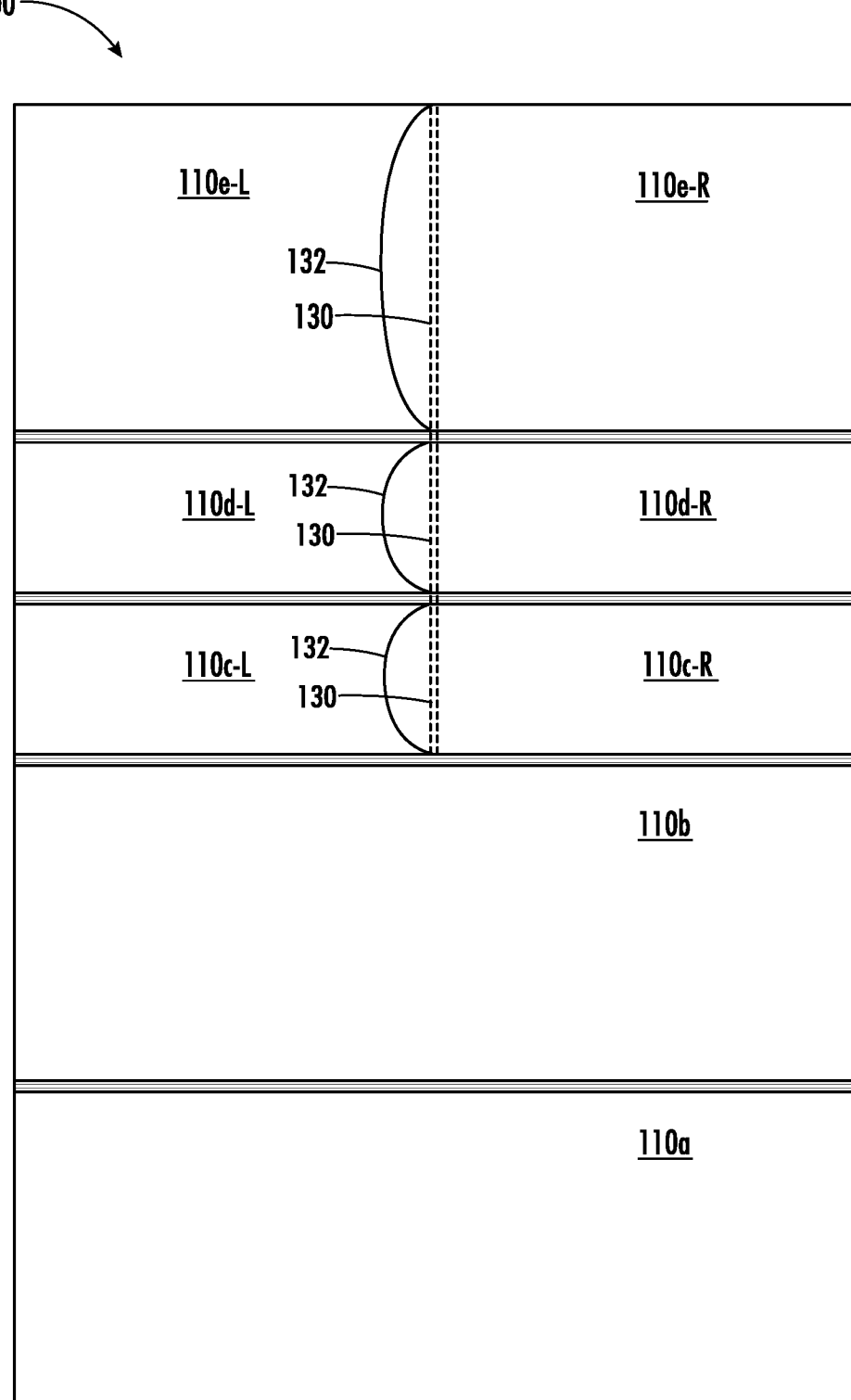

FIG. 11 is a plan view of another example of the configurable cargo support structure 100 shown in FIG. 5 and FIG. 6 that includes multiple split foldable panels 110. In this example, configurable cargo support structure 100 may include multiple full-width foldable panels, e.g., 110*a* and 110*b*, and multiple split foldable panels, e.g., 110*c*, 110*d*, and 110*e*. In this example, split foldable panel 110*c* may include right foldable panel 110*c*-R and left foldable panel 110*c*-L, split foldable panel 110*d* may include right foldable panel 110*d*-R and left foldable panel 110*d*-L, and split foldable panel 110*e* may include right foldable panel 110*e*-R and left foldable panel 110*e*-L.

Figure 12:

FIG. 12 is a plan view of yet another example of the configurable cargo support structure 100 shown in FIG. 5 and FIG. 6 that includes multiple split foldable panels 110. In this example, configurable cargo support structure 100 may include at least one full-width foldable panel, e.g., 110*a* and multiple split foldable panels, e.g., 110*b*, 110*c*, 110*d*, and 110*e*. In this example, split foldable panel 110*b* may include right foldable panel 110*b*-R and left foldable panel 110*b*-L, split foldable panel 110*c* may include right foldable panel 110*c*-R and left foldable panel 110*c*-L, split foldable panel 110*d* may include right foldable panel 110*d*-R and left foldable panel 110*d*-L, and split foldable panel 110*e* may include right foldable panel 110*e*-R and left foldable panel 110*e*-L.

Additionally, the configurable cargo support structure is not limited to the configurations shown hereinabove with reference to FIG. 1 through FIG. 12. Other configurations are possible. For example, the configurable cargo support structure may include any number and/or arrangements of full-width and/or split foldable panels 110 and wherein the full-width and/or split foldable panels 110 may be any dimensions. Further, a split foldable panel 110 is not limited to two panels only.

Referring now again to FIG. 4 through FIG. 12, configurable cargo support structure 100 may be configured based on the vehicle seat configuration and thereby provide a platform for maximizing the cargo capacity of a vehicle. Accordingly, configurable cargo support structure 100 may be used to provide a substantially continuous rigid and/or semi-rigid platform for holding cargo in the cargo area of a vehicle. Again, a main benefit of configurable cargo support structure 100 is that it may provide a rigid and/or semi-rigid support platform for holding cargo atop any folded down seats in a vehicle and thereby providing maximized cargo area. For example, the strength of configurable cargo support structure 100 covering the gap between the captain seats may support significant cargo weight. A further benefit is that the configurable cargo support structure 100 may protect the folded down seats in a vehicle from damage and/or dirt when cargo is loaded/transported in the cargo area 210.

An example of using configurable cargo support structure 100 to provide a substantially continuous rigid and/or semi-rigid platform for holding cargo in the cargo area of a vehicle is provided now with reference to FIG. 13 through FIG. 18. For example, FIG. 13 through FIG. 18 are plan views of an example of the configurable cargo support structure 100 shown in FIG. 5 through FIG. 12 installed in a vehicle (e.g., vehicle 200) according to various example seat configurations.

Figure 13:
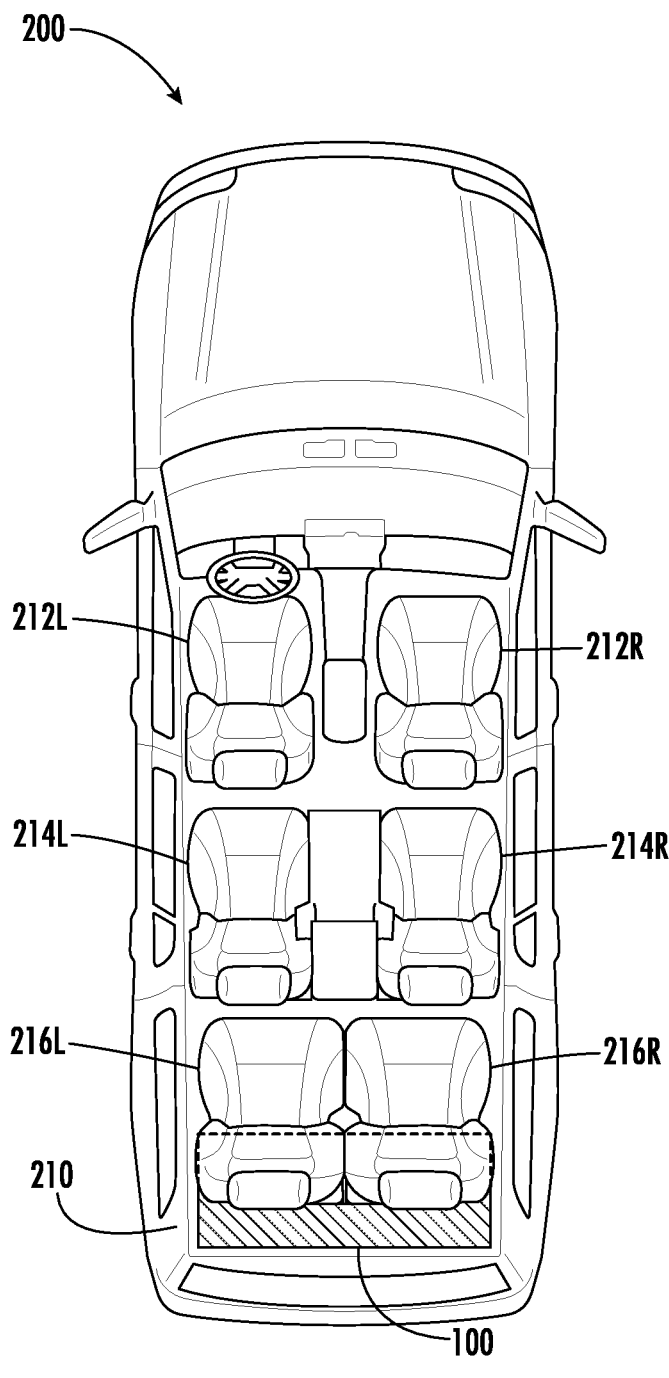

In one configuration, FIG. 13 shows vehicle 200 with all seats selected, meaning the second row seats 214, and the third row seats 216 are folded up (or present). In this example, foldable panels 110 of configurable cargo support structure 100 may be folded accordion style in a stack in the cargo area 210 behind the third row seats 216. This configuration demonstrates that configurable cargo support structure 100 may remain in vehicle 200 even when all seats are selected.

Figure 14:
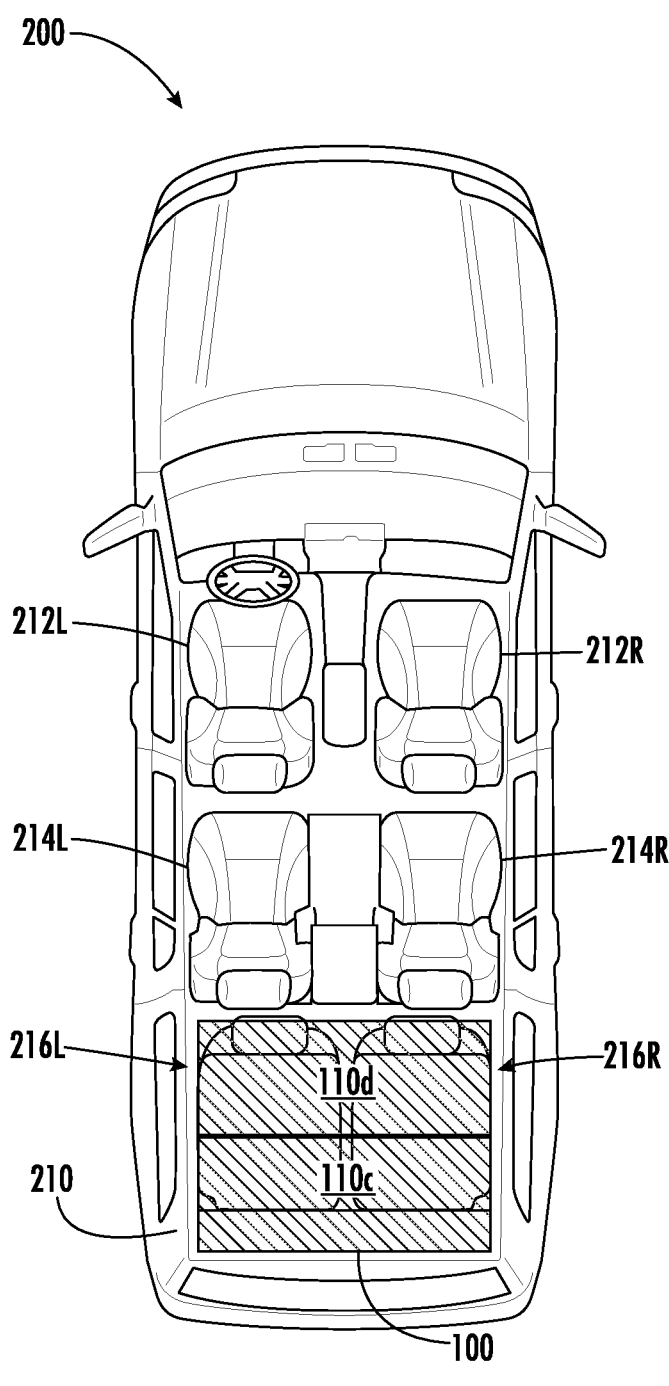

In another configuration, FIG. 14 shows vehicle 200 with the second row seats 214 folded up (or present) while the third row seats 216 are folded down (or removed) to expand cargo area 210 as compared with the cargo area 210 shown in FIG. 13. In this example, configurable cargo support structure 100 is configured such that the area of less than all of foldable panels 110 may be used to cover the expanded cargo area 210 created by the absence of the third row seats 216. In one example, multiple foldable panels 110, e.g., 110*a*, 110*b*, of configurable cargo support structure 100 may be unfolded such that foldable panels 110 cover the expanded cargo area 210.

Figure 15:
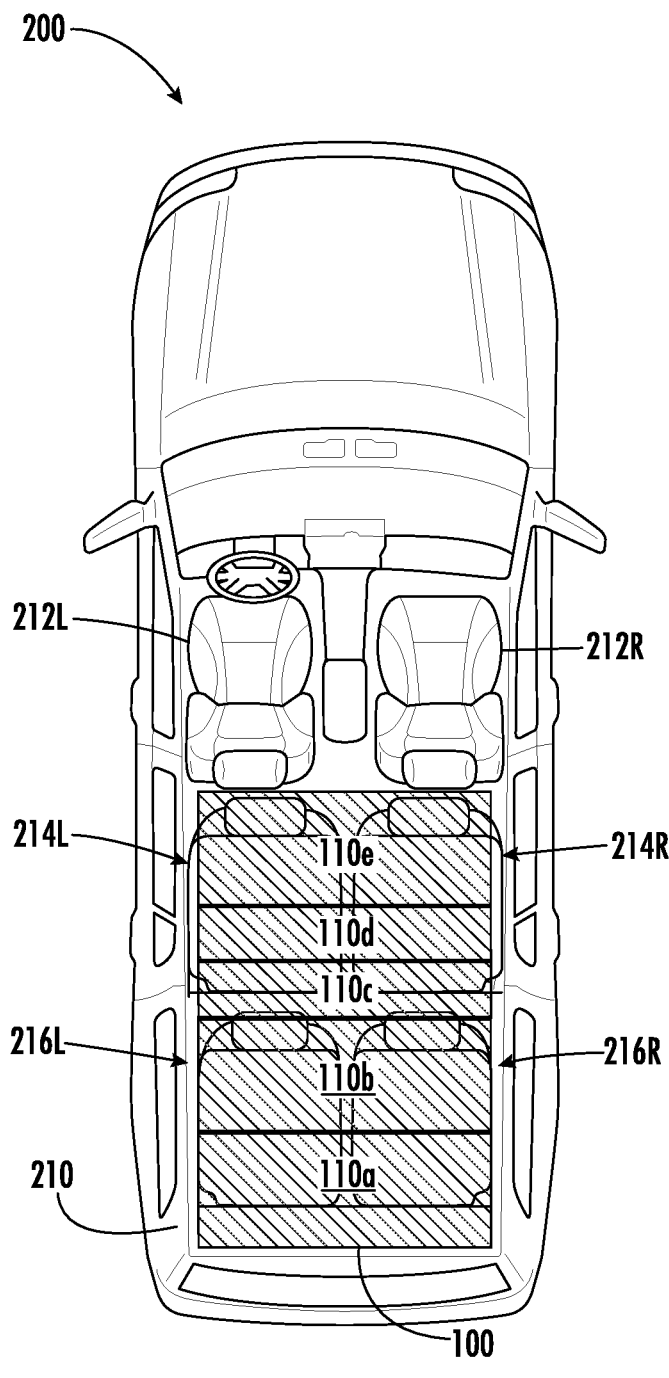

In yet another configuration, FIG. 15 shows vehicle 200 with both the second row seats 214 and the third row seats 216 folded down (or removed) to provide yet more cargo area 210 as compared with the cargo area 210 shown in FIG. 14. In this example, all foldable panels 110 of configurable cargo support structure 100 may be unfolded to cover substantially the entire cargo area 210 created by the absence of both the second row seats 214 and the third row seats 216.

Figure 16:
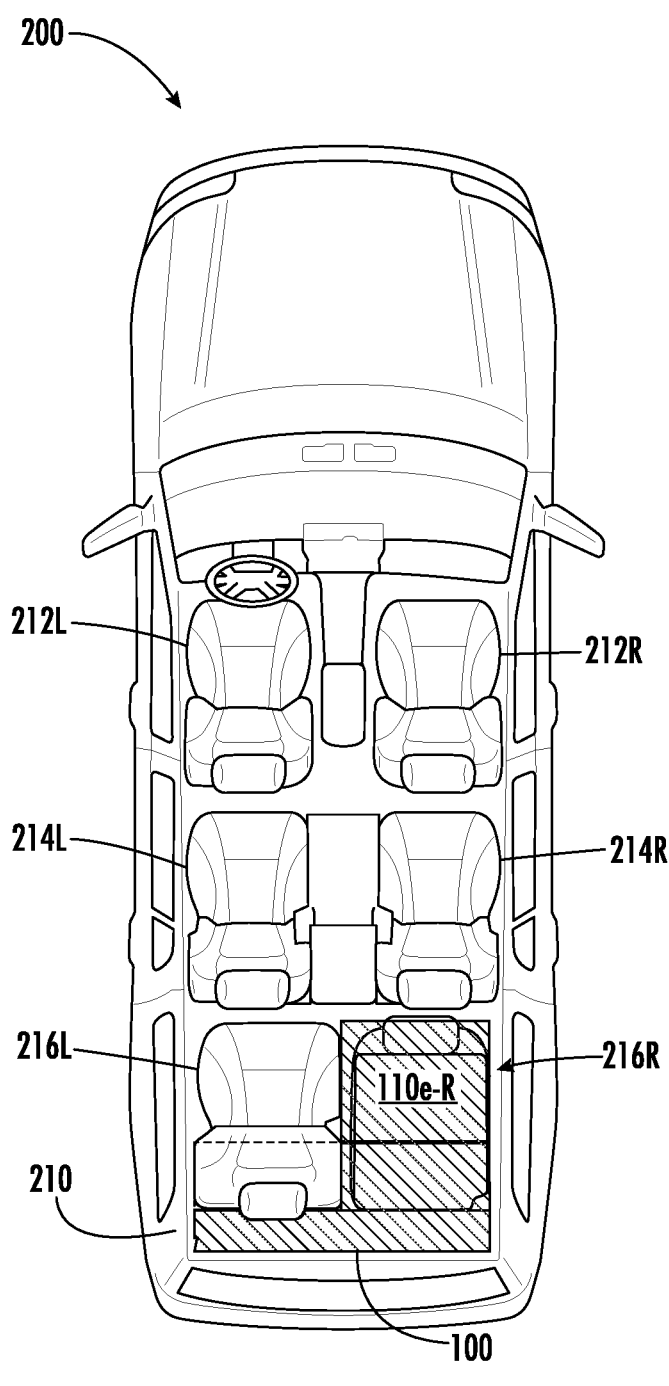
Figure 17:
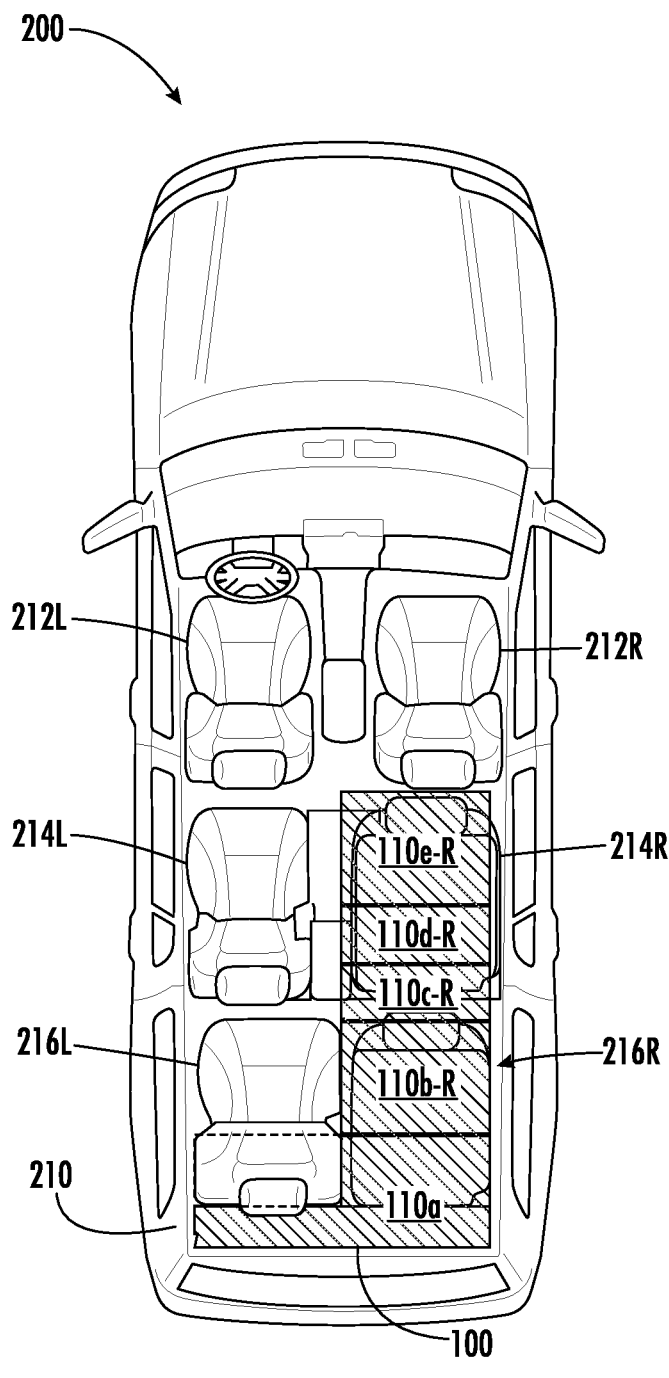
Figure 18:
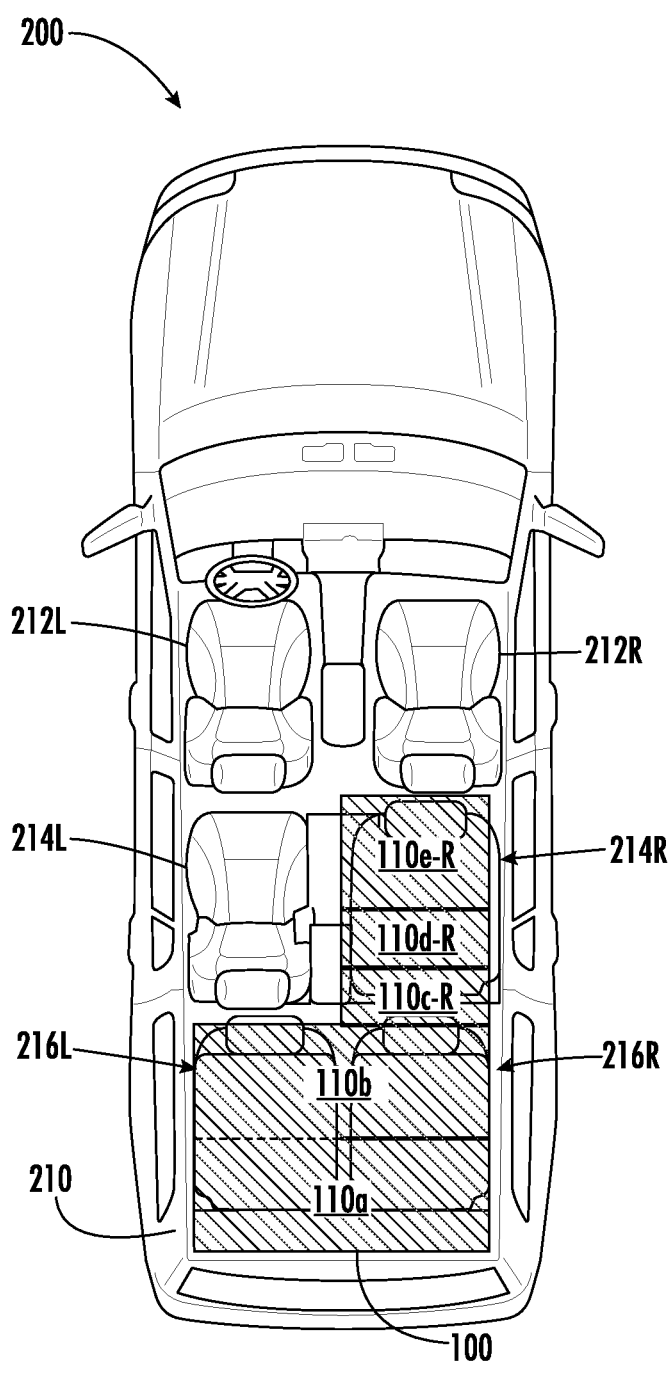

While FIG. 13, FIG. 14, and FIG. 15 show examples of using a configurable cargo support structure 100 that includes the full-width foldable panels 110, FIG. 16, FIG. 17, and FIG. 18 show examples of using a configurable cargo support structure 100 that includes one or more split foldable panels 110.

In yet another configuration, FIG. 16 shows vehicle 200 with the second row seats 214 and one third row seat 216 (e.g., 216L) folded up (or present) while the other third row seat 216 (e.g., 216R) may be folded down (or removed) to expand cargo area 210 as compared with the cargo area 210 shown in FIG. 13. In this example, configurable cargo support structure 100 is configured such that the area of one full-width foldable panel 110 plus one right-side split foldable panel 110 (e.g., 110*e*-R) may be used to cover the expanded cargo area 210 created by the absence of third row seat 216R. In this example, the left-side split foldable panel 110*e*-L (not shown) may remain folded behind third row seat 216L.

In still another configuration, FIG. 17 shows vehicle 200 with one second row seat 214 (e.g., 214L) and one third row seat 216 (e.g., 216L) folded up (or present) while the other second row seat 214 (e.g., 214R) and other third row seat 216 (e.g., 216R) may be folded down (or removed) to expand cargo area 210 as compared with the cargo area 210 shown in FIG. 13. In this example, configurable cargo support structure 100 is configured such that the area of one full-width foldable panel 110 plus multiple split foldable panels 110 (e.g., 110*b*-R, 110*c*-R, 110*d*-R, 110*e*-R) may be used to cover the expanded cargo area 210 created by the absence of second row seat 214R and third row seat 216R. In this example, the left-side split foldable panels 110 (e.g., 110*b*-L, 110*c*-L, 110*d*-L, 110*e*-L not shown) may remain folded behind third row seat 216L.

In yet another configuration, FIG. 18 shows vehicle 200 with one second row seat 214 (e.g., 214L) folded up (or present) and the other second row seat 214 (e.g., 214R) folded down (or removed), while the third row seats 216 (e.g., 216L and 216R) may be folded down (or removed) to expand cargo area 210 as compared with the cargo area 210 shown in FIG. 13. In this example, configurable cargo support structure 100 is configured such that the area of two full-width foldable panels 110, e.g., 11*a* and 11*b*, plus multiple split foldable panels 110, e.g., 110*c*-R, 110*d*-R, 110*e*-R, may be used to cover the expanded cargo area 210 created by the absence of third row seats 216 and second row seat 214R. In this example, the left-side split foldable panels 110*c*-L, 110*d*-L, 110*e*-L may remain folded behind second row seat 214L (shown as 110*e*-L in FIG. 18).

Referring now to FIG. 19 illustrate a plan view of another example configurable cargo support structure 100' that may be used in conjunction with the configurable cargo support structure 100. Configurable cargo support structure 100' may include adjacent foldable panels 110' (e.g., foldable panels 110*a*', 110*b*', 110*c*', 110*d*', 110*e*'). Configurable cargo support structure 100' is similar in most aspects as that of configurable cargo support structure 100 shown in FIGS. 5 and 6, with the exception that configurable cargo support structure 100' has a full-width W' that is less than the full-width W of configurable cargo support structure 100. In one example, full-width W' of configurable cargo support structure 100' may be about half of the full-width W of configurable cargo support structure 100. Configurable cargo support structure 100' may have a fully expanded length Lf, which, in one example, may be substantially equal to the fully expanded length of configurable cargo support structure 100. In one embodiment, as shown for example in FIG. 19, one or more of the foldable panels 110' may have a length L1 and one or more of the foldable panels 110 may have a length L2. Alternatively, the length of all the foldable panels 110' may be substantially equal to one another.

An example of using configurable cargo support structure 100' in conjunction with the configurable cargo support structure 100 of FIGS. 5 and 6, to provide a substantially continuous rigid and/or semi-rigid platform for holding cargo in the cargo area of a vehicle is provided now with reference to FIG. 20 through FIG. 22. For example, FIG. 20 through FIG. 22 are plan views of an example of the configurable cargo support structure 100' configurable cargo support structure 100 of FIGS. 5 and 6 installed in a vehicle (e.g., vehicle 200) according to various example seat configurations.

In one configuration, FIG. 20 shows vehicle 200 with the second row seats 214 and one third row seat 216 (e.g., 216L) folded up (or present) while the other third row seat 216 (e.g., 216R) may be folded down (or removed) to expand cargo area 210. In this example, foldable panels 110 of configurable cargo support structure 100 may remain folded accordion style in a stack in the cargo area 210 behind the third row seats 216, and one or more foldable panels 110', e.g., 110*a*', 110*b*', of configurable cargo support structure

100' are configured (unfolded) such that the area of the one or more unfolded foldable panels 110' may be used to cover the expanded cargo area 210 created by the absence of third row seat 216R. In this example, foldable panels 110 of configurable cargo support structure 100 remain folded behind the third row seat 216, while one or more panels 110' of configurable cargo support structure 100' may be unfolded to cover expanded cargo area 210 created by the absence of third row seat 216R (or alternatively 216L). In this configuration, a portion of the foldable panels 110', e.g., 110*a*', of configurable cargo support structure 100' may rest atop the folded up foldable panels 110 of configurable cargo support structure 100, while one or more of the other foldable panels 110', e.g., 110*b*', of configurable cargo support structure 100' may be unfolded to cover the expanded cargo area 210 created by the absence of third row seat 216R (or alternatively 216L). Collectively, the unfolded foldable panels 110 and 110' of the configurable cargo support structures 100 and 100', cover the expanded cargo area 210 created by the absence of third row seat 216R (or alternatively 216L).

In another configuration, FIG. 21 shows vehicle 200 with one second row seat 214 (e.g., 214L) and one third row seat 216 (e.g., 216L) folded up (or present) while the other second row seat 214 (e.g., 214R) and third row seat 216 (e.g., 216R) may be folded down (or removed) to expand cargo area 210. In this example, foldable panels 110 of configurable cargo support structure 100 may remain folded accordion style in a stack in the cargo area 210 behind the third row seats 216, and multiple foldable panels 110', e.g., foldable panels 110*a*', 110*b*', 110*c*', 110*d*', 110*e*', of configurable cargo support structure 100' may be configured (e.g., unfolded) such that the area of the unfolded foldable panels 110' may be used to cover the expanded cargo area 210 created by the absence of second row seat 214R and third row seat 216R. In this example, foldable panels 110 of configurable cargo support structure 100 remain folded behind the third row seat 216, while multiple foldable panels 110' of configurable cargo support structure 100' may be unfolded to cover the expanded cargo area 210 created by the absence of second row seat 214R and third row seat 216R (or alternatively 214L and 216L). In this configuration, a portion of the foldable panels 110', e.g., 110*a*', of configurable cargo support structure 100', may rest atop the folded up foldable panels 110 of configurable cargo support structure 100, while the other foldable panels 110', e.g., 110*b*', 110*c*', 110*d*', 110*e*', of configurable cargo support structure 100', may be unfolded to cover the expanded cargo area 210 created by the absence of second row seat 214R and third row seat 216R (or alternatively 214L and 216L). Collectively, the unfolded foldable panels 110 and 110' of the configurable cargo support structures 100 and 100', cover the expanded cargo area 210 created by the absence of second row seat 214R and third row seat 216R (or alternatively 214L and 216L).

In yet another configuration, FIG. 22 shows vehicle 200 with one second row seat 214 (e.g., 214L) folded up (or present) while the other second row seat 214 (e.g., 214R) and the third row seats 216 (e.g., 216L, 216R) may be folded down (or removed) to expand cargo area 210. In this example, one or more of foldable panels 110, e.g., 110*b*, of configurable cargo support structure 100 may be unfolded to cover the expanded cargo area 210 created by the absence of the third row seats 216, and multiple foldable panels 110', e.g., foldable panels 110*a*', 110*b*', 110*c*', 110*d*', 110*e*', of configurable cargo support structure 100' may be configured (e.g., unfolded) such that the area of the unfolded foldable panels 110' may be used to cover the expanded cargo area 210 created by the absence of second row seat 214R (or alternatively 214L). In this configuration, a portion of the panels 110', e.g., 110*a*', 110*b*', of configurable cargo support structure 100' may rest atop a portion of foldable panels 110, e.g., 110*a*, 110*b*, of configurable cargo support structure 100, while the other foldable panels 110', e.g., 110*c*', 110*d*', 110*e*', of configurable cargo support structure 100', may be unfolded to cover the expanded cargo area 210 created by the absence of second row seat 214R (or alternatively 214L). Collectively, the unfolded foldable panels 110 and 110' of the configurable cargo support structures 100 and 100', cover the expanded cargo area 210 created by the absence of the third row seats 216 and second row seat 214R (or alternatively 214L).

Referring now to FIG. 23 is a flow diagram of an example of a method 300 of using the configurable cargo support structure 100 (and optionally 100') including foldable panels 110 (and optionally 110') that may be configured based on the vehicle seat configuration. Using method 300, configurable cargo support structure 100 (and optionally 100') may provide a substantially continuous rigid and/or semi-rigid platform for holding cargo in the cargo area of a vehicle and maximizing the cargo capacity of the vehicle. In one example, configurable cargo support structure 100 (and optionally 100') and method 300 may provide a rigid and/or semi-rigid support platform for holding cargo atop any folded down seats in a vehicle to maximize usable cargo space and to protect from damage and/or dirt. For example, configurable cargo support structure 100 (and optionally 100') and method 300 may provide a platform for supporting significant cargo weight. Method 300 may include, but is not limited to, one or more of the following steps, and may be carried out in a different order.

At a step 310, the configurable cargo support structure may be provided. In one example, the configurable cargo support structure 100 (and optionally 100') as shown, for example, in any of FIGS. 4-6 and 19 may be provided.

At a step 315, the vehicle seat configuration may be adjusted in any way desired. In one example, the vehicle seat configuration of a vehicle 200 may be provided as shown in any one of FIGS. 13-18, 20-22 (or any other desired configuration).

At a step 320, the configurable cargo support structure may be arranged to substantially match the desired vehicle seat configuration. For example, the configurable cargo support structure 100 (and optionally 100'), shown in any of FIGS. 4-6 and 19, may be arranged to substantially match the desired vehicle seat configuration, for example, as shown and described in FIGS. 13-18, 20-22.

The sequence of and which of the foldable panels 110 are unfolded/folded and/or positioned is not limited to that described above or as shown in the Figures, these are meant as examples only to illustrate, in general, how the foldable panels 110 of the configurable cargo support structure 100 may be configured.

In summary and referring now again to FIG. 1 through FIG. 23, the configurable cargo support structure 100, 100' and method 300 may provide certain beneficial features, such as, but not limited to, the following.

The configurable cargo support structure and method may provide a series of rigid and/or semi-rigid panels encased in a strong, durable but malleable rubber material that may be attached to each other using a hinge-like rubber composition, or other suitable hinging mechanism or technique.

The configurable cargo support structure and method provide a design that allows the panels to be folded securely and stacked upon each other in a compact manner.

The configurable cargo support structure and method provide a design wherein the rigidity of the panels may form a strong platform that when laid flat in the cargo area may be used to bridge the gap between seats, and other gaps formed, when one or more of the seats are in a folded (or removed) configuration. This is because the panels when fully extended may cover the entire cargo bay as one flat uninterrupted platform without gaps. Further, the strength of the platform covering the gaps, e.g., between the captain seats, may support significant cargo weight.

The configurable cargo support structure and method provide a design wherein when the vehicle is arranged in the two-seat, three-seat, or any seat configuration the panels may simply be folded accordion-style and remain in the vehicle in the space behind the last seat, regardless of seating configuration. In this state, the panels may be flat at the very rear of the cargo area and may have an aggregate thickness when stacked of, in one non-limiting example, in the range of about 3 inches to about 5 inches. This allows the continued availability of the space in the very rear of the cargo area. Even in the fully folded configuration, the configurable cargo support structure provides for storage space on top of it.

The configurable cargo support structure and method provide a design wherein regardless of the vehicle seat configuration the configurable cargo support structure may be folded in a way that allows maximum cargo capacity.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the subject matter of the present invention. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A configurable cargo support structure, comprising:
   a. a plurality of foldable support panels comprising a first panel, a second panel, a third panel, and a fourth panel, wherein the plurality of foldable support panels are each of the same length in a first state, and are made of at least one of a rigid or semi-rigid material;
   b. foldable joints, the foldable joints connecting adjacent ones of the plurality of foldable support panels in a foldable manner, the foldable joints extending along at least a portion of a width of adjacent foldable support panels;
   c. wherein the second, third, and fourth support panels are configurable to rest upon backs of one or more rows of seats in a vehicle when one or more of the one or more rows of seats are in a folded down position, and wherein at least one of the second or third support panels are configured to further be foldable in half lengthwise in a second state converting its length in half, and wherein the foldable one of the second or third support panels is immediately adjacent one of the first panel or the fourth panel; and
   d. further wherein, in a first stored configuration the first, second, third, and fourth support panels are stackable one on top of the other in a single vertical stack to rest fully in a rear cargo space behind a rear most row of seats; in a second partially deployed configuration the first support panel rests in the cargo space and less than all of the second, third, and fourth support panels are positionable upon the backs of one or more folded down seats to form a substantially flat continuous planer support surface across at least a portion of the cargo area and the backs of the one or more folded down seats upon which they are positioned, and in the event of a gap present between one or more of the folded down seats upon which they are positioned, to also span the gap therebetween; and in a third fully deployed configuration the first support panel rests in the cargo space and the second, third, and fourth support panels are positionable upon the backs of the folded down seats and to form a substantially flat continuous planer support surface across the cargo area and the backs of all the folded down seats, and in the event of a gap present between one or more of the folded down seats upon which they are positioned, to also span the gap therebetween.

2. The configurable cargo support structure of claim 1, wherein the foldable support panels comprise an outer covering material.

3. The configurable cargo support structure of claim 2, wherein the foldable joints are formed of the outer covering material at a space along the length between adjacent foldable support panels.

4. The configurable cargo support structure of claim 1, wherein adjacent foldable support panels are configured to fold atop one another in a folded configuration.

5. The configurable cargo support structure of claim 4, wherein the foldable support panels are configurable to fold accordion style in a single stack in the first stored configuration.

6. The configurable cargo support structure of claim 4, wherein in the second partially deployed configuration one of the second or third support panels is in its second state and folded in half lengthwise.

7. The configurable cargo support structure of claim 1, wherein the foldable support panels all comprise the same width.

8. The configurable cargo support structure of claim 1, wherein one or more of the foldable support panels are split widthwise, wherein the one or more split foldable support panels are configurable to be of a full width in a non-split configuration or a partial width in a split configuration.

9. The configurable cargo support structure of claim 8, wherein the one or more split foldable support panels each comprise a first split panel and a second split panel, and wherein at least one of the first split panel and the second split panel comprises a flap that overlaps a portion of the other one of the first split panel and the second split panel.

10. The configurable cargo support structure of claim 1, wherein a thickness at the foldable joint is less than a thickness of the foldable support panels.

11. A method of using a configurable cargo support structure, comprising:
   a. providing a configurable cargo support structure, comprising:
      i. a plurality of foldable support panels comprising a first panel, a second panel, a third panel, and a fourth panel, wherein the plurality of foldable support panels are each of the same length in a first state, and are made of at least one of a rigid or semi-rigid material;
      ii. foldable joints, the foldable joints connecting adjacent ones of the plurality of foldable support panels in a foldable manner, the foldable joints extending along at least a portion of a width of adjacent foldable support panels;
      iii. wherein the second, third, and fourth support panels are configurable to rest upon backs of one or more rows of seats in a vehicle when one or more of the one or more rows of seats are in a folded down position, and wherein at least one of the second or third support panels is configured to further be foldable in half lengthwise in a second state converting its length in half, and wherein the foldable one of the second or third support panels is immediately adjacent one of the first panel or the fourth panel; and
      iv. further wherein, in a first stored configuration the first, second, third, and fourth support panels are stackable one on top of the other in a single vertical stack to rest fully in a rear cargo space behind a rear most row of seats; in a second partially deployed configuration the first support panel rests in the cargo space and less than all of the second, third, and fourth support panels are positionable upon the backs of one or more folded down seats to form a substantially flat continuous planer support surface across at least a portion of the cargo area and the backs of the one or more folded down seats upon which they are positioned, and in the event of a gap present between one or more of the folded down seats upon which they are positioned, to also span the gap therebetween; and in a third fully deployed configuration the first support panel rests in the cargo space and the second, third, and fourth support panels are positionable upon the backs of the folded down seats and to form a substantially flat continuous planer support surface across the cargo area and the backs of all the folded down seats, and in the event of a gap present between one or more of the folded down seats upon which they are positioned, to also span the gap therebetween;

b. adjusting a seat configuration of a vehicle; and c. arranging one or more of the plurality of foldable support panels of the first configurable cargo support structure to substantially match the adjusted vehicle seat configuration.

12. The method of claim 11, wherein the plurality of foldable support panels are arranged to substantially cover an expanded vehicle cargo area created by folding down or removing one or more seats during the adjusting of the seat configuration of the vehicle.

13. The method of claim 12, wherein the plurality of foldable support panels create a substantially continuous span across the expanded vehicle cargo area.

\* \* \* \* \*